US012790129B2

(12) United States Patent
Radic et al.

(10) Patent No.: US 12,790,129 B2
(45) Date of Patent: Nov. 10, 2026

(54) AI-POWERED LOAD STABILITY ESTIMATION FOR PALLET HANDLING

(71) Applicant: Gideon Brothers d.o.o., Osijek (HR)

(72) Inventors: Juraj Radic, Donji Stupnik (HR); Valentina Zadrija, Zagreb (HR); Darko Janekovic, Zagreb (HR)

(73) Assignee: Gideon Brothers d.o.o., Osijek (HR)

( * ) Notice: Subject to any disclaimer, the term of this patent is extended or adjusted under 35 U.S.C. 154(b) by 405 days.

(21) Appl. No.: 18/544,101

(22) Filed: Dec. 18, 2023

(65) Prior Publication Data

US 2024/0208736 A1 Jun. 27, 2024

Related U.S. Application Data

(60) Provisional application No. 63/477,260, filed on Dec. 27, 2022.

(51) Int. Cl.
*B65G 45/02* (2006.01)
*B65G 1/04* (2006.01)
*B65G 43/02* (2006.01)

(52) U.S. Cl.
CPC ............... *B65G 43/02* (2013.01); *B65G 1/04* (2013.01); *B65G 2203/0233* (2013.01); *B65G 2203/041* (2013.01)

(58) Field of Classification Search
CPC .......... B65G 43/02; B65G 1/04; G05D 1/243; G05D 1/667; G06N 3/02; G06N 3/045; G06N 3/08; G06N 20/00; G06V 10/82; G06V 20/58; B66F 9/063; B66F 17/003; B66F 9/0755
See application file for complete search history.

(56) References Cited

U.S. PATENT DOCUMENTS 8,538,577 B2 * 9/2013 Bell ..................... G05D 1/0246 700/214
9,358,975 B1 * 6/2016 Watts ................... G05D 1/0223
9,932,213 B2 * 4/2018 Buchmann .............. B66F 9/146
9,990,535 B2 * 6/2018 Phillips .................. G06T 7/337
10,377,613 B2 * 8/2019 Goto ..................... B66F 9/0755
10,850,961 B2 * 12/2020 Tanaka ................. G01B 11/002
11,858,795 B2 * 1/2024 Tracy .................... B66F 9/0755
2024/0308828 A1 * 9/2024 Tracy ....................... G01V 8/20

FOREIGN PATENT DOCUMENTS

JP 2020001906 A * 1/2020 ............ B66F 9/0755
WO WO-2021087312 A1 * 5/2021 ............ B66F 9/0755
WO WO-2024117255 A1 * 6/2024 ........... G01G 19/083
WO WO-2024173600 A1 * 8/2024 .............. B66F 9/065

* cited by examiner

*Primary Examiner* — Patrick H Mackey
(74) *Attorney, Agent, or Firm* — FENWICK & WEST LLP

(57) ABSTRACT

An autonomous mobile robot receives sensor data from one or more sensors. The sensor data includes image data depicting a load coupled to a pallet and depth data indicating distance of surfaces of the load or the pallet from the one or more sensors. A first machine-learning model is applied to the image data to generate a first mask and second mask. The first mask represents the load, and the second mask represents the pallet. The first mask, the second mask, and/or the depth data are then used to determine a load orientation and load size. Based on the load orientation and load size, the robot evaluates the load's stability. If the stability is deemed safe, the robot is caused to lift the pallet.

20 Claims, 14 Drawing Sheets

400

FIG. 9
Row clustering
643
Row clustering ex 1
Cluster 2
P1
P2
Cluster 1
Row clustering ex 2
Cluster 1
P2

1400

AI-POWERED LOAD STABILITY ESTIMATION FOR PALLET HANDLING

CROSS REFERENCE TO RELATED APPLICATIONS

This application claims the benefit of U.S. Provisional Application No. 63/477,260, filed Dec. 27, 2022, which is hereby incorporated by reference herein in its entirety.

TECHNICAL FIELD

The disclosure generally relates to the field of autonomous robotics, and more specifically relates to artificial intelligence (AI) powered load stability estimation for pallet handling.

BACKGROUND

In industries like logistics and warehousing, pallets are often used to provide stable support for goods during lifting by various equipment such as forklifts, pallet jacks, front loaders, jacking devices, or erect cranes. Ensuring pallet load stability is vital to avoid accidents, damage to goods, and handling inefficiencies. Generally, stability is manually maintained by evenly distributing weight on the pallet. For instance, placing heavier items at the base and arranging items to prevent uneven or top-heavy configurations is common. Stacking methods are chosen to enhance stability, like interlocking boxes or precise edge alignment, and avoiding pyramid stacking in favor of column or block stacking. To further secure the load, stretch wrap, strapping, or banding may be employed. Additionally, corner or edge protectors are sometimes utilized for extra stability and to safeguard the load during strapping and handling.

SUMMARY

In recent developments, autonomous mobile robots, such as autonomous mobile forklifts, may be introduced to automate material handling in warehouse logistics. These operations often occur in confined spaces, like trailers docked at warehouses where pallets need to be loaded or unloaded to maintain material flow. Given the limited space, these loading or unloading operations must be executed safely and efficiently, presenting an extra layer of complexity in managing pallet load stability.

The present disclosure provides a solution to the above-described problem by using an AI-powered autonomous mobile robot to estimate pallet load stability. In some embodiments, the robot can estimate whether the load is overhanging or underhanging the pallet, and by how much. In some embodiments, the robot can also estimate whether the load is tilted with respect to the pallet and by how much.

One or more sensors are coupled to the autonomous mobile robot. The autonomous mobile robot is configured to receive sensor data from the one or more sensors. For example, the one or more sensors may include cameras configured to capture image data comprising an image depicting a load coupled to a pallet. As another example, the one or more sensors may also include LIDAR configured to capture depth data comprising information indicating distance of surfaces of the load or the pallet from the one or more sensors. A first machine-learning model is applied to the image data to generate a first mask and a second mask on the image data. The first mask corresponds to the load, and the second mask corresponds to the pallet. Using these masks, combined with the depth data, the robot can determine the orientation and size of the load on the pallet, which can then be used to determine the load stability. It is then determined whether it is safe to lift the pallet, considering the determined stability of the load. Responsive to determining that it is safe to lift the pallet, the robot is caused to lift the pallet. In some embodiments, the determination may be performed by a computing system configured to communicate with the robot. Alternatively, the determination may be performed by the robot itself.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Autonomous mobile robots, such as autonomous mobile forklifts, may be introduced to automate material handling in warehouse logistics. These operations often occur in confined spaces, like trailers docked at warehouses where pallets need to be loaded or unloaded to maintain material flow. Given the limited space, these loading or unloading operations must be executed safely and efficiently, presenting an extra layer of complexity in managing pallet load stability.

Embodiments described herein solve the above-described problem by using an AI-powered autonomous mobile robot to estimate pallet load stability. The autonomous mobile robot is coupled with one or more sensors, such as a camera, a LIDAR, etc. The one or more sensors are configured to capture image data and depth data. The image data comprises an image depicting a load coupled to a pallet. The depth data comprises information indicating distance of surfaces of the load or the pallet from the one or more sensors. A first machine-learning model is applied to the image data to generate a first mask and a second mask on the image data. The first mask represents the load, and the second mask represents the pallet. Using these masks, combined with the depth data, the robot can determine the orientation and size of the load on the pallet, which can then be used to determine the load stability. It is then determined whether it is safe and appropriate to lift the pallet, considering the determined stability of the pallet. Responsive to determining that it is safe and appropriate to lift the pallet, the robot is caused to lift the pallet. In some embodiments, the determination may be performed by a computing system configured to communicate with the robot. Alternatively, the determination may be performed by the robot itself.

System Environment

Figure 1:
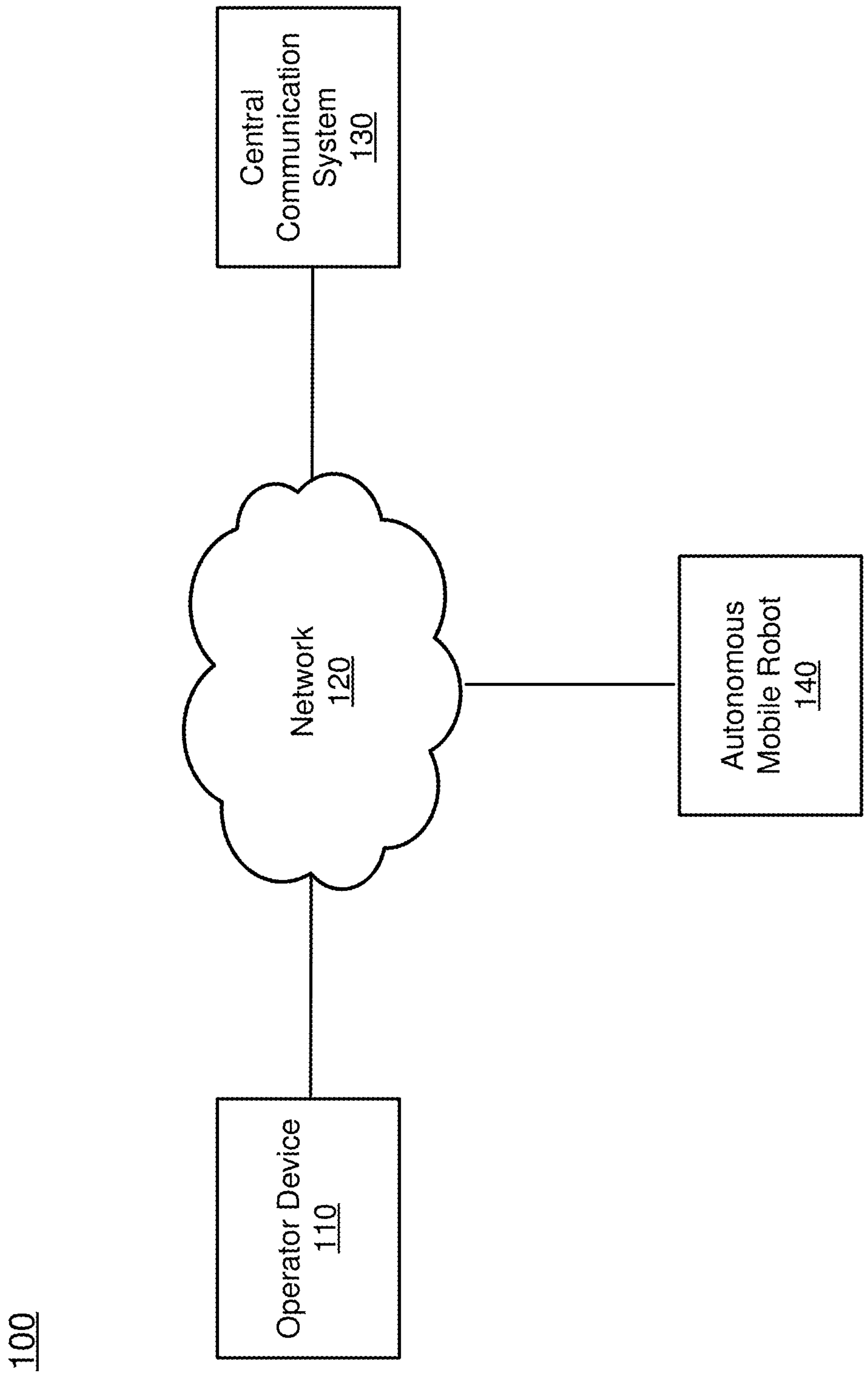
FIG. 1 illustrates an example environment for operating an autonomous mobile robot using a central communication system, in accordance with one or more embodiments.

FIG. 1 illustrates an example environment for operating an autonomous mobile robot using a central communication system, in accordance with one or more embodiments. Environment 100 includes operator device 110, network 120, central communication system 130, and autonomous mobile robot 140. Environment 100 is typically described herein as a warehouse environment for convenience and illustrative purposes, however, environment 100 may be any environment, such as a manufacturing environment. Environment 100 need not be limited to a defined space (e.g., an interior of a warehouse), and may include any areas that are within the purview of instructions of an autonomous mobile robot (e.g., parking lots, loading docks, and so on that are outside of a warehouse space). While operator device 110 and central communication system 130 are depicted as being within environment 100, this is merely for convenience; these devices may be located outside of environment 100 (e.g., at a home, office, data center, cloud environment, etc.).

Operator device 110 may be any client device that interfaces one or more human operators with one or more autonomous mobile robots of environment 100 and/or central communication system 130. Exemplary client devices include smartphones, tablets, personal computers, kiosks, and so on. While only one operator device 110 is depicted, this is merely for convenience, and a human operator may use any number of operator devices to interface with autonomous mobile robots 140 and/or central communication system 130. Operator device 110 may have a dedicated application installed thereon (e.g., downloaded from central communication system 130) for interfacing with autonomous mobile robot 140 and/or central communication system 130. Alternatively, or additionally, operator device 110 may access such an application by way of a browser. References to operator device 110 in the singular are done for convenience only, and equally apply to a plurality of operator devices.

Network 120 may be any network suitable for connecting operator device 110 with central communication system 130 and/or autonomous mobile robot 140. Exemplary networks may include a local area network, a wide area network, the Internet, an ad hoc network, and so on. In some embodiments, network 120 may be a closed network that is not connected to the Internet (e.g., to heighten security and prevent external parties from interacting with central communication system 130 and/or autonomous mobile robot 140). Such embodiments may be particularly advantageous where client device 110 is within the boundaries of environment 100.

Central communication system 130 acts as a central controller for a fleet of one or more robots including autonomous mobile robot 140. Central communication system 130 receives information from the fleet and/or operator device 110 and uses that information to make decisions about activity to be performed by the fleet. Central communication system 130 may be installed on one device, or may be distributed across multiple devices. Central communication system 130 may be located within environment 100 or may be located outside of environment 100 (e.g., in a cloud implementation). Further details about the operation of central communication system 130 are described below with reference to FIG. 2.

Autonomous mobile robot 140 may be any robot configured to act autonomously with respect to a command. For example, in the warehouse environment, autonomous mobile robot 140 may be commanded to move an object from a source area to a destination area, and may be configured to make decisions autonomously as to how to optimally perform this function (e.g., which side to lift the object from, which route to take, and so on). Autonomous mobile robot 140 may be any robot suitable for performing a commanded function. Exemplary autonomous mobile robots include vehicles (e.g., forklifts, mobile storage containers, etc.) and planted devices that are affixed to a surface (e.g., mechanical arms). Further details about the functionality of autonomous mobile robot 140 are described in further detail below with respect to FIG. 3. References to autonomous mobile robot 140 in the singular are made for convenience and are non-limiting; these references equally apply to scenarios including multiple autonomous mobile robots.

Exemplary Central Communication System Configuration

Figure 2:
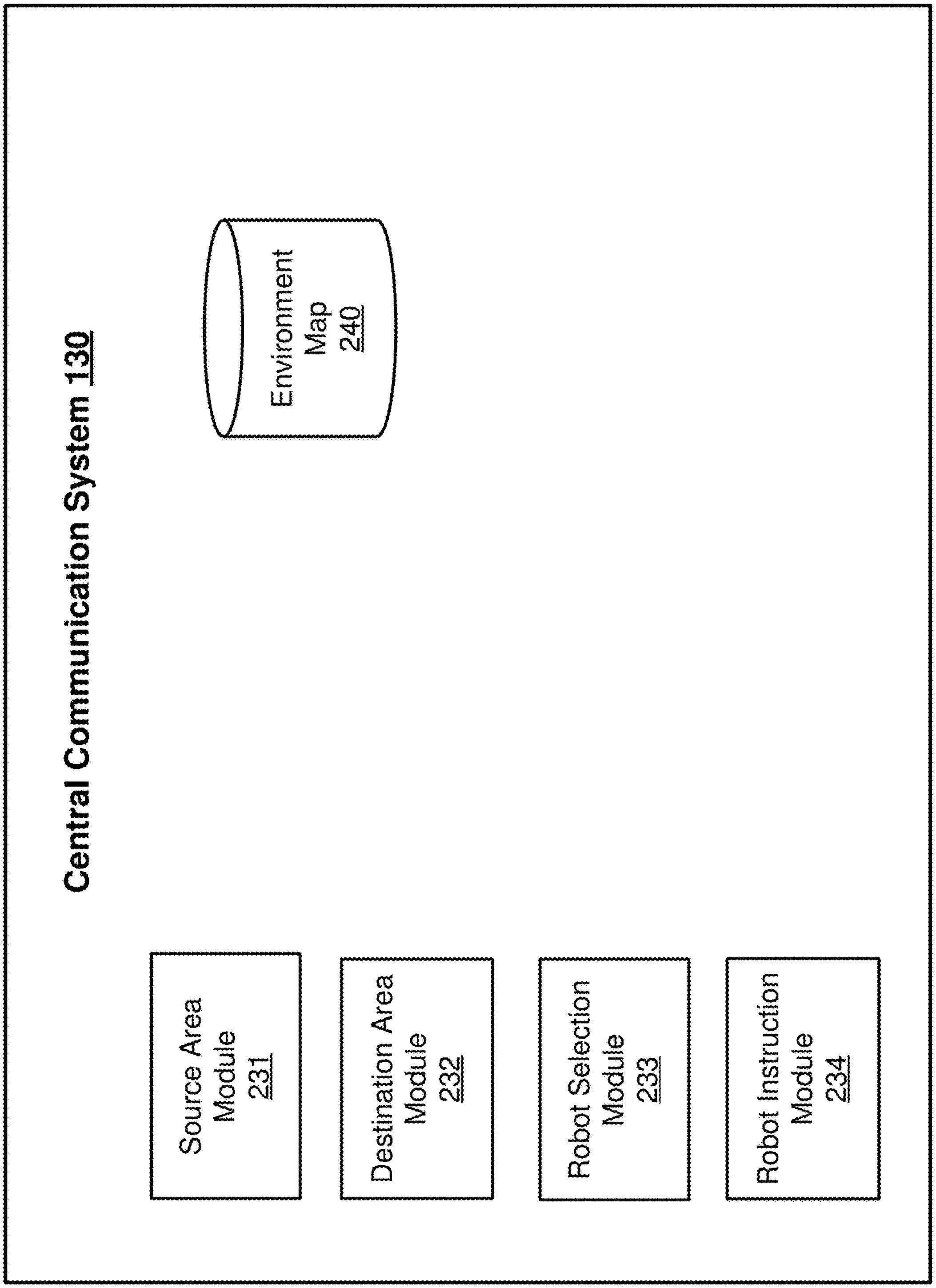
FIG. 2 illustrates exemplary modules and data stores used by the central communication system, in accordance with one or more embodiments.

FIG. 2 illustrates one embodiment of exemplary modules and data stores used by the central communication system. As depicted in FIG. 2, central communication system 130 includes source area module 231, destination area module 232, robot selection module 233, and robot instruction module 234, as well as environment map 240. The modules and databases depicted in FIG. 2 are merely exemplary; fewer or more modules and/or databases may be used by central communication system 130 to achieve the functionality disclosed herein.

Source area module 231 identifies a source area. The term source area, as used herein, may refer to either a single point in a facility, several points in a facility, or a region surrounded by a boundary (sometimes referred to herein as a source boundary) within which a robot is to manipulate objects (e.g., pick up objects for transfer to another area). In an embodiment, source area module 231 receives input from operator device 110 that defines the point(s) and/or region that form the source area. For example, source area module 231 may cause operator device 110 to display a user interface including a map of the facility, within which the user of operator device 110 may provide input showing point(s) and/or drawing a region whose boundaries define the source area. In an embodiment, source area module 231 may receive input from one or more robots (e.g., image and/or depth sensor information showing objects known to need to be moved (e.g., within a predefined load dock)), and may automatically determine a source area to include a region within a boundary that surrounds the detected objects. In either embodiment, the source area may change dynamically as objects are manipulated (e.g., source area module 232 may shrink the size of the source area by moving boundaries inward as objects are transported out of the source area, and/or may increase the size of the source area by moving boundaries outward as new objects are detected).

Destination area module 232 identifies a destination area. The term destination area, as used herein, may refer to either a single point in a facility, several points in a facility, or a region surrounded by a boundary (sometimes referred to herein as a destination boundary) within which a robot is to manipulate objects (e.g., drop an object off to rest). For example, where the objects are pallets in a warehouse setting, the destination area may include several pallet stands at different points in the facility, any of which may be used to drop off a pallet. Destination area module 232 may identify the destination area in any manner described above with respect to a source area, and may also identify the destination area using additional means.

Destination area module 232 may determine the destination area based on information about the source area and/or the objects to be transported. Objects in the source area may have certain associated rules that add constraints to the destination area. For example, there may be a requirement that the objects be placed in a space having a predefined property (e.g., a pallet must be placed on a pallet stand, and thus the destination area must have a pallet stand for each pallet to be moved). As another example, there may be a requirement that the objects be placed at least a threshold distance away from the destination area boundary, and thus, destination area module 232 may require a human draw the boundary at least at this distance and/or may populate the destination boundary automatically according to this rule (and thus, the boundary must be drawn at least that distance away). Yet further, destination area module 232 may require that the volume of the destination area is at least large enough to accommodate all of the objects to be transported that are initially within the source area.

Source area module 231 and destination area module 232 may, in addition to, or alternative to, using rules to determine their respective boundaries, may use machine learning models to determine their respective boundaries. The models may be trained to take information as input, such as some or all of the above-mentioned constraints, sensory data, map data, object detection data, and so on, and to output boundaries based thereon. The models may be trained using prior mission data, where operators have defined or refined missions based on various parameters and constraints.

The robot selection module 233 selects one or more robots to transport objects from the source area to the destination area. In an embodiment, robot selection module 233 performs this selection based on one or more of a capability of the robots and a location of the robots within the facility. The term capability, as used herein, refers to a robot's ability to perform a task related to manipulation of an object. For example, if an object must be lifted, the robot must have the capability to lift objects, to lift an object having at least the weight of the given object to be lifted, and so on. Other capabilities may include an ability to push an object, an ability to drive an object (e.g., a mechanical arm may have an ability to lift an object, but may be unable to drive an object because it is affixed to, e.g., the ground), and so on. Further capabilities may include lifting and then transporting objects, hooking and then towing objects, tunneling and then transporting objects, using robots in combination with one another (e.g., an arm or other manipulates an object (e.g., lifts), places on another robot, and the robot then drives to the destination with the object). These examples are merely exemplary and non-exhaustive. Robot selection module 233 may determine required capabilities to manipulate the object(s) at issue, and may select one or more robots that satisfy those capabilities.

In terms of location, robot selection module 233 may select one or more robots based on their location to the source area and/or the destination area. For example, robot selection module 233 may determine one or more robots that are closest to the source area, and may select those robot(s) to manipulate the object(s) in the source area. Robot selection module 233 may select the robot(s) based on additional factors, such as an amount of objects to be manipulated, capacity of the robot (e.g., how many objects the robot can carry at once; sensors the robot is equipped with; etc.), speed of the robot, and so on. In an embodiment, robot selection module 233 may select robots based on a state of one or more robot's battery (e.g., a closer robot may be passed up for a further robot because the closer robot has insufficient battery to complete the task). In an embodiment, robot selection module 233 may select robots based on their internal health status (e.g., where a robot is reporting an internal temperature close to overheating, that robot may be passed up even if it is otherwise optimal, to allow that robot to cool down). Other internal health status parameters may include battery or fuel levels, maintenance status, and so on. Yet further factors may include future orders, a scheduling strategy that incorporates a longer horizon window (e.g., a robot that is optimal to be used now may, if used now, result in inefficiencies (e.g., depleted battery level or sub-optimal location), given a future task for that robot), a scheduling strategy that incorporates external processes, a scheduling strategy that results from information exchanged between higher-level systems (e.g., WMS, ERP, EMS, etc.), and so on.

In addition to the rules-based approach described in the foregoing, robot selection module 233 may select a robot using machine learning model trained to take various parameters as input, and to output one or more robots best suited to the task. The inputs may include available robots, their capabilities, their locations, their state of health, their availability, mission parameters, scheduling parameters, map information, and/or any other mentioned attributes of robots and/or missions. The outputs may include an identification of one or more robots to be used (or suitable to be used) to execute a mission. Robot selection module 233 may automatically select one or more of the identified robots for executing a mission, or may prompt a user of operator device 110 to select from the identified one or more robots (e.g., by showing the recommended robots in a user interface map).

Robot instruction module 234 transmits instructions to the selected one or more robots to manipulate the object(s) in the source area (e.g., to ultimately transport the object(s) to the destination area). In an embodiment, robot instruction module 234 includes detailed step-by-step instructions on how to transport the objects. In another embodiment, robot instruction module 234 transmits a general instruction to transmit one or more objects from the source area to the destination area, leaving the manner in which the objects will be manipulated and ultimately transmitted up to the robot to determine autonomously.

Environment map database 240 includes one or more maps representative of the facility. The maps may be two-dimensional, three-dimensional, or a combination of both. Central communication facility 130 may receive a map from operator device 110, or may generate one based on input received from one or more robots 140 (e.g., by stitching together images and/or depth information received from the robots as they traverse the facility, and optionally stitching in semantic, instance, and/or other sensor-derived information into corresponding portions of the map).

Regardless of how maps are generated, environment map database 240 may be updated by central communication facility 130 based on information received from operator device 110 and/or from the robots 140. Information may include images, depth information, auxiliary information, semantic information, instance information, and any other information described herein. The maps may include information about objects within the facility, obstacles within the facility, and auxiliary information describing activity in the facility. Auxiliary information may include traffic information (e.g., a rate at which humans and/or robots access a given path or area within the facility), information about the robots within the facility (e.g., capability, location, etc.), time-of-day information (e.g., traffic as it is expected during different segments of the day), and so on.

In an embodiment, the maps may include semantic and/or instance information. The semantic information may identify classes of objects within the maps. For example, the map may show, that for a given object, the object is of a given class, such as "pallet", "obstacle," "human," "robot," "pallet stand," and so on. The instance information may indicate the boundaries of each object. For example, a semantic map alone may not be usable by a robot to distinguish the boundary between two adjacent pallets that are abutting one another, as every pixel observed by the robot and representative of the pallets would be classified in an identical manner. However, with instance information, the robot is able to identify and distinguish different pallets from one another. The instance information may, in addition to indicating boundaries, indicate identifiers of individual objects (e.g., through a taxonomy scheme, the system may assign identifiers to different objects, such as P1, P2, and P3 for successively identified pallets). Semantic information may be populated into the map where a semantic segmentation algorithm executed either by a robot, or by central communication facility 130 (in processing raw image data transmitted from the robot to the central communication facility) recognizes an object in space (e.g., using instance information to delineate object boundaries as necessary). Semantic information may additionally, or alternatively, be imported into the map where a human operator of operator device 110 indicates, using a user interface, that an object is positioned at a particular location on the map.

Central communication facility 130 may continuously update the maps as such information is received (e.g., to show a change in traffic patterns on a given path). Central communication facility 130 may also update maps responsive to input received from operator device 110 (e.g., manually inputting an indication of a change in traffic pattern, an area where humans and/or robots are prohibited, an indication of a new obstacle, and so on).

Maps may be viewable to an operator by way of a user interface displayed on operator device 110. Information within the maps may be visible to the operator. For example, segment and instance information for any given object, robot, or obstacle represented in the map may be visible. Moreover, representations of auxiliary information may be overlaid on the map. For example, a type of auxiliary information may be selected by a user (e.g., by selecting a selectable option corresponding to the type from within the user interface). The user interface may output a heat map representation of the auxiliary information. As an example, the heat map may represent human traffic (e.g., frequency or density of human beings in a given location). The user interface may enable a user to select a time, or a length of time, at which to view the heat map. This may be useful, for example, to determine human activity throughout different parts of a facility at different times and on different days. This information may be usable by robots as well to make autonomous routing decisions to, e.g., avoid areas where human traffic is frequent.

Exemplary Autonomous Mobile Robot Configuration

Figure 3:
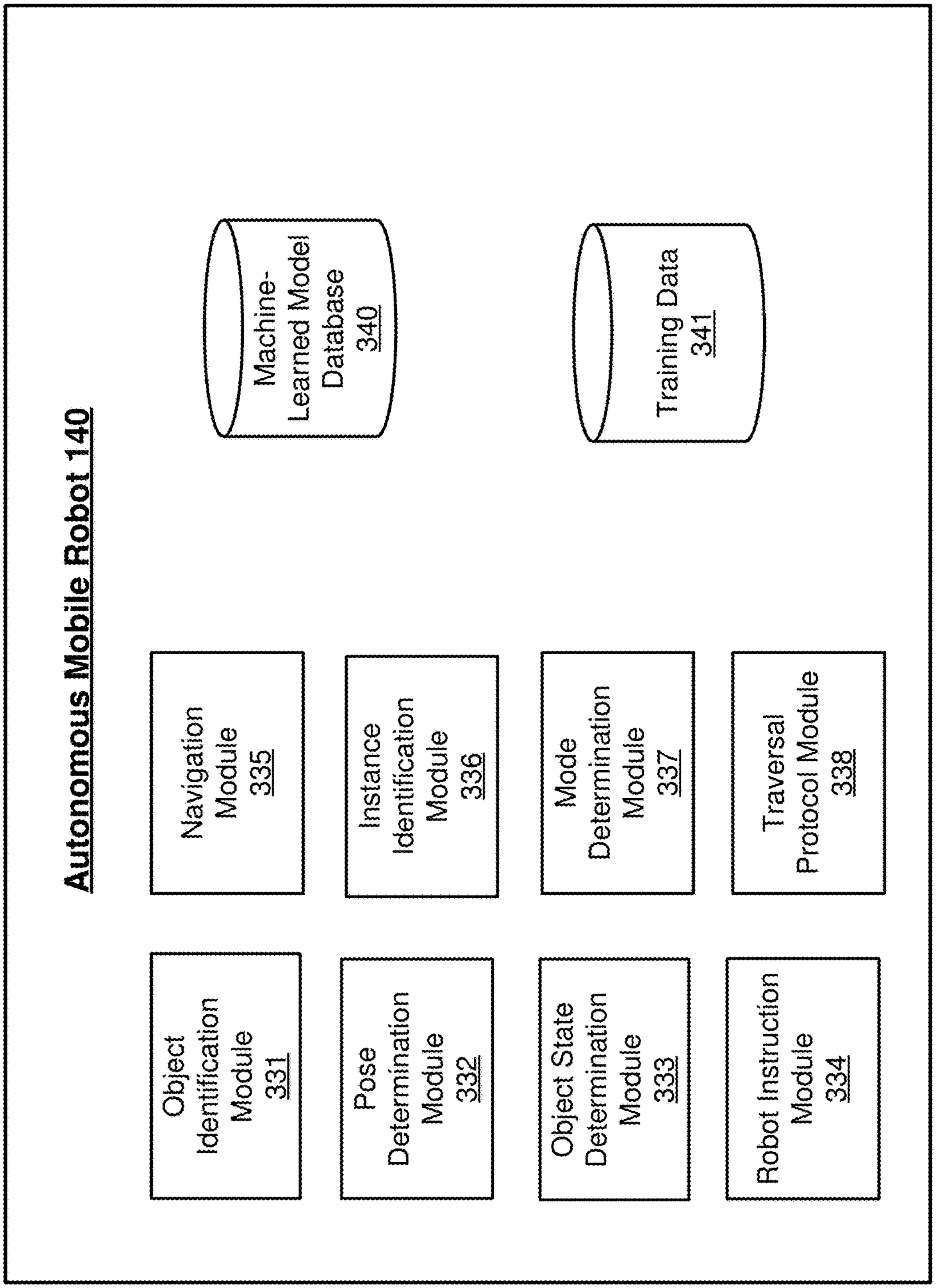
FIG. 3 illustrates exemplary modules and data stores used by the autonomous mobile robot, in accordance with one or more embodiments.

FIG. 3 illustrates one embodiment of exemplary modules and data stores used by the autonomous mobile robot. As depicted in FIG. 3, autonomous mobile robot 140 includes object identification module 331, pose determination module 332, object state determination module 333, robot instruction module 334, navigation module 335, instance identification module 336, mode determination module 337, traversal protocol module 338, machine-learned model database 340, and training data database 341. The modules and databases depicted in FIG. 3 are merely exemplary; fewer or more modules and/or databases may be used to achieve the functionality described herein.

Object identification module 331 ingests information received from robot sensors 140 and outputs information that identifies an object in proximity to the robot. The sensors may include one or more cameras, one or more depth sensors, one or more scan sensors (e.g., RFID), a location sensor (e.g., showing location of the robot within the facility and/or GPS coordinates), and so on. Object identification module 331 may utilize information from a map of the facility (e.g., as retrieved from document map database 240) in addition to information from robot sensors in identifying the object. For example, object identification module 331 may utilize location information, semantic information, instance information, and so on to identify the object.

In an embodiment, object identification module 331 queries a database with information derived from the sensors (e.g., dimension information, coloration, information derived from an RFID scan or a QR code, etc.), and receives in response to the query an identification of a matching object (if any object is found to be matching). In an embodiment, object identification module 331 inputs the information derived from the sensors into a machine-learned model (e.g., stored in machine-learned model database 340), and receives as output a probability that the information matches one or more candidate objects. Object identification module 331 determines, based on the probability exceeding a threshold for a given candidate object, that the candidate object is a detected object from the sensor information. An identifier of an object may specifically identify the object (e.g., where the object is a cinderblock, an identifier of which cinderblock it is, such as Cinderblock A14 where there are other cinderblocks A1-100, B1-100, etc.), and/or may identify one or more characteristics of the object (e.g., by type, such as pallet; by dimensions, such as 2×2 meters, by weight (e.g., as derived from auxiliary information of a map of maps database 240); and so on).

Pose determination module 332 determines a pose of a given object. The term pose, as used here, may refer to an orientation of an object and/or a location (including x, y, and z coordinates). The orientation may be absolute, or relative sensors, or to another object to be manipulated and/or obstacle (e.g., a wall, a delivery truck, etc.). The pose may refer to an orientation of the object as a whole and/or sub-objects within the object (e.g., the orientation of a payload on top of a pallet, which may be offset from the pallet base itself). A pose of an object may affect the route a robot takes when approaching the object to manipulate the object.

Pose determination module 332 captures a red-green-blue (RGB) image of an object to be transported from a source to a destination (e.g., using a camera sensor of the robot when approaching the object). The use case of an RGB image is merely exemplary and used throughout for convenience. The image, wherever RGB is used herein, may instead be any other type of image, such as a grayscale image. Pose determination module 332 may also capture depth information representative of the object from a depth sensor of the autonomous robot (e.g., to determine dimensions of the object). Pose determination module 332 may use any other information described above with respect to object identification in order to determine pose.

In an embodiment, pose determination module 332 may generate a bounding box within the RGB image surrounding the object. While described below with reference to pose determination module 332, the bounding box may alternatively be generated by object identification module 331 and/or a single module that performs the activity of both of these modules. The bounding box may be a two-dimensional bounding box and/or a three-dimensional bounding box. A two-dimensional (2D) bounding box may be defined with, e.g., 2 or 3 features (e.g., corners or other keypoints) of an object. A three-dimensional (3D) bounding box includes at least 4 features to be extracted to generate the bounding box. In an embodiment, to generate a 3D bounding box, a 2D bounding box may first be extracted by applying a machine-learned model to the image. Pose determination module 332 may then search the image to identify additional features (e.g., further keypoints of a 3D box such as corners). The three-dimensional bounding box may include the 2D bounding box as connected to the one or more additional features. In an embodiment, a machine learned model may take the image as input, and may output a 3D bounding box without the aforementioned interstitial steps. The 3D bounding box may incorporate information about the object pose (e.g., where the machine learned model takes pose information as input). The bounding box may be generated using heuristics (e.g., by using computer vision to identify the boundaries of the object relative to other items within the RGB image), or may be generated using machine learning (e.g., by inputting the RGB image, optionally including the depth information, into a machine-learned model, and receiving as output a bounding box). The machine learning model may be a deep learning model, trained to pair images and depth information with bounding boxes.

Pose determination module 332 applies a machine-learned model (e.g., as obtained from machine-learned model database 340) to the RGB image and/or the bounding box. Optionally, depth information may be included as input to the machine-learned model. The machine-learned model is configured to identify features of the object based on one or more of the identified object type, the RGB image, and the depth information. The term feature as used herein may refer to a predefined portion of significance of an object, such as a keypoint of the object. Features may include, for example, corners, curves, or other expected features of candidate objects. As an example, a pallet may be expected to have 8 keypoints, the 8 keypoints corresponding to corners of the pallet. The machine learning model may additionally identify a type of the object, or may take the type of the object as input based on output from object identification module 331, which may result in a more robust determination of features.

The machine-learned model may be trained using training data from training data database 341. Training data database may include labeled images, the labels of each image indicating at least one of one or more visible features and an object type. Based on an angle at which an image of an object is captured, some features may be obscured and/or occluded by other objects. For example, if an image of a pallet is captured at an angle that perfectly faces one side of the pallet, the pallet will appear to be a two-dimensional rectangle, and only four keypoints will be visible. If the pallet is captured at a rotated angle, however, then depending on the angle, six or seven corners (e.g., keypoints) may be visible. The training data may include examples of objects and their visible features from many different angles, to ensure that objects of new images can be identified regardless of how many keypoints are visible based on the angle of orientation used when images are captured. The labels may provide macro and/or micro categorizations of objects (e.g., pallet, large pallet, 2×3 meter pallet, etc.).

In an embodiment, prior to applying the machine-learned model to the RGB image, pose determination module 332 reduces the degrees of freedom of the object from six to four degrees of freedom by constraining the object to a horizontal position. This improves processing efficiency and accuracy of the machine learning model, in that a much smaller set of training data is needed to accurately fit the RGB image to the training data.

In an embodiment, the machine-learned model may be configured to output a respective confidence score for each respective identified feature. The confidence score may be derived from a probability curve reflecting how well the input data fits to the training data. Pose determination module 332 may compare each respective confidence score to a threshold. Responsive to determining that a respective confidence score does not meet or exceed the threshold, pose determination module 332 may output a determination that its respective feature is not visible. In an embodiment, responsive to determining that no respective feature is visible, pose determination module 332 may determine that the three-dimensional pose is indeterminable. Alternatively, pose determination module 332 may require a threshold number of features to be visible, and may determine that the three-dimensional pose is indeterminable where greater than zero, but less than the threshold, a number of features is determined to not be visible based on the confidence scores. Pose determination module 332 may, responsive to determining that the three-dimensional pose is indeterminable, transmit an alert that is caused to be received by operator device 110 (e.g., by way of direct transmission, or by way of transmitting information to central communication system 13, which in turn transmits the alert to operator device 110.

Having received identification of features of the object, pose determination module 332 may determine which of the identified features of the object are visible to the autonomous robot, and may determine therefrom a three-dimensional pose of the object. For example, pose determination module 332 may query a database indicating the type of the object and the identified features, and may receive an indication of a pose that corresponds to the type and identified features (e.g., rotated 3 degrees from center). As another example, pose determination module 332 may input the features, optionally including dimension information (e.g., distances between each feature, depth of each feature, etc.) into a machine learning model, and may receive an indication of the pose as an output of the machine learning model.

Object state determination module 333 determines whether the three-dimensional pose corresponds to a valid state. States may be valid or invalid. Valid states are states of an object where the object is considered manipulatable (e.g., the object is oriented in a position that can be approached; the object does not have any unsafe features, such as loose additional objects on top of it, and so on). Invalid states are states of an object where the object is not considered manipulatable (e.g., because manipulation of the object by the robot would be unsafe).

Robot instruction module 334 determines whether to output instructions to the robot to manipulate the object. In an embodiment, in response to determining that the three-dimensional pose corresponds to the valid state, robot instruction module 334 outputs instructions to the robot to manipulate the object. Where the object is not in a valid state, robot instruction module 334 may instruct the robot to analyze another object for manipulation and/or may cause an alert to be output to operator device 110 (e.g., by communicating the invalid state to central communication system 130, which may alert operator device 110). In an embodiment, object state determination module 333 may, periodically, or at some aperiodic time interval or responsive to some condition, again evaluate whether the three-dimensional pose corresponds to valid state. For example, multiple objects may be near one another, some in a valid state, and others in an invalid state. As valid state objects are manipulated, previously inaccessible sides of invalid state objects may be exposed. A potential condition for re-evaluating whether the three-dimensional pose corresponds to valid state may include object state determination module 333 determining that an object has been moved or a previously inaccessible side of an invalid object has been exposed. Object state determination module 333 may determine that manipulation with the previously unexposed side is possible, and may convert the state of the object to a valid state.

In an embodiment, when the object is in a valid state, robot instruction module 334 may determine a side of the object that is optimal for manipulation. The term optimal for manipulation may refer to, relative to each approachable side of an object, a side that can be approached for manipulation. More than one side may be determined to be optimal, should two sides be approachable. In order to determine which of multiple sides is to be approached, robot instruction module 334 may determine whether a side has a highest likelihood of success, offers an efficiency gain, is safer relative to human beings in the vicinity, and may compute improvements based on any other parameter or any combination of parameters. For example, the object may be blocked on one or more sides from manipulation, because other objects are abutting the object on those sides. As another example, approaching the object from a given side may result in a more efficient path to be taken from the source area to the destination area than approaching from a different side. Robot instruction module 334 may instruct the robot to manipulate the object from the determined side.

In an embodiment, robot instruction module 334 may revise its assessment on which side is optimal for manipulation based on an interaction with the object. For example, robot instruction module 334 may initially approach an object from the north, but, when lifting the object, may detect based on feedback from a weight sensor that the weight of the object is primarily distributed to the south. Robot instruction module 334 may disengage the object, and re-approach it from the south in such a scenario for manipulation.

Robot instruction module 334, after having selected an object and having approached the object and manipulated it for transfer to the destination area, may instruct the robot to transport the selected object through the facility from the source area to a destination area. The route may be selected and updated by the robot using navigation module 335, based on information derived from environment 100 and environment information determined by way of capturing and processing images along the route (e.g., encountering unexpected obstacles such as objects, human beings, etc.). Robot navigation module 335 may also consider information in a map (e.g., high human traffic areas) when determining the route.

After reaching the destination area, robot instruction module 334 may instruct the robot to unload the selected object at a location within the destination area in any manner described above based on information from central communication system 130, or based solely on an analysis of autonomous mobile robot 140. In an embodiment, autonomous mobile robot 140 may determine where to unload the object based on a first number of objects of the plurality of objects already unloaded within the destination area and based on a second number of objects of the plurality of objects yet to be unloaded within the destination area. For example, autonomous mobile robot 140 may unload initial objects far enough into the destination area to ensure that there is room for all subsequent objects to be unloaded.

Autonomous mobile robot 140 may determine that a number of objects to be unloaded within the destination is uncertain. This may occur due to occlusion, such as where some objects are visible, but other objects behind those objects are not visible. In such a scenario, autonomous mobile robot 140 may generate an inference of how many objects are to be unloaded. To generate the inference, autonomous mobile robot 140 may use a depth sensor, and based on the dimensions of visible objects, infer a count of how many more objects are behind the visible objects based on how deep the space is. In some embodiments, rather than depth sensor data, other data may be used to generate the inference (e.g., dimensions of a source area, assuming the source area is filled to a particular capacity, such as 75% or 100%). Autonomous mobile robot 140 may unload objects within the destination area in a manner that ensures that the inferred number of objects can be unloaded into the destination area. For example, autonomous mobile robot 140 may stack the objects, unload the objects from back-to-front, generate aisles, and so on in a manner that preserves space for the additional objects. Autonomous mobile robot 140 may update its inference as objects are unloaded. For example, where images taken after some occluding objects are transported from the source area to the destination area show large empty spaces where it was presumed another object was hidden, the autonomous mobile robot 140 may subtract a number of objects that fit within those large empty spaces.

The instance identification module 336 determines instances when the autonomous mobile robot 140 is approaching objects for manipulation. For example, autonomous mobile robot 140 may identify using sensors that it is approaching one or more objects of a certain class (e.g., by comparing the sensor information to a semantic map). Autonomous mobile robot 140 may access instance information (e.g., by querying environment map 240), and may therewith differentiate two or more abutting objects sharing a same class (e.g., two or more pallets). Autonomous mobile robot 140 may utilize this information when determining how to manipulate an object (e.g., by using boundary information to determine where to approach an object, such as by finding the center of a side of the object to approach). Instances may additionally, or alternatively, be determined based on empty space or other edges existing between objects, such that each separate instance is readily identified separately from each other instance.

Mode determination module 337 determines a mode of operation of the autonomous mobile robot 140. The term mode of operation (or "mode" alone as shorthand) as used herein may refer to a collection of parameters and/or constraints that restrict the operation of a robot to a subset of activities. In some modes (e.g., a normal operation mode), restrictions may be omitted, such that every functionality is available to a robot. As an example, in one mode of operation, a robot may be constrained to ensure that the robot keeps a berth of at least a minimum distance between itself and any obstacle, but may be allowed to travel at high speeds. In another mode of operation, the robot may be constrained by a smaller minimum distance between itself and obstacles, but given the lower margin for error, because the robot is closer to obstacles, the robot may be required to travel below a threshold speed that is lower than it would be if the minimum distance were higher. Modes may be defined based on types of obstacles encountered as well; that is, parameters such as minimum distance may vary based on whether a robot versus a human versus a fixed inanimate obstacle is detected. These constraints and parameters are merely exemplary; modes may be programmed to define parameters and constraints in any manner.

As autonomous mobile robot 140 executes a mission, mode determination module 337 processes obstacles encountered by autonomous robot 140, and determines therefrom whether conditions corresponding to a mode change are encountered. In an embodiment, mode determination module 337 determines that a mission cannot be continued if a current mode is not changed to a different mode. For example, where a current mode requires a distance of three meters be maintained from a nearest obstacle, and where autonomous mobile robot 140 must pass through a narrow corridor where this minimum distance cannot be maintained to complete the mission, mode determination module 337 determines that the route cannot be continued. Responsively, mode determination module 337 determines whether there is a different mode that can be used that allows for passage through the narrow corridor (e.g., a mode where the minimum distance requirement is sufficiently reduced to a lower berth that accommodates the corridor width, e.g., to maintain safety, a maximum speed may also be reduced). Where such a mode is available, a mode determination module 337 adopts this alternative mode and switches operation of the autonomous mobile robot 140 to this alternative mode. Autonomous mobile robot 140 thereafter continues the route.

In an embodiment, mode determination module 337 may use a default mode (e.g., a mode having a high distance requirement and allowing for a high maximum speed) wherever possible. Following the example above, mode determination module 337 may, in such an embodiment, determine when the narrow corridor is cleared, such that reverting to the default mode with the higher distance requirement is again feasible. Responsive to determining that the narrow corridor is cleared, a mode determination module 337 may revert operation of the autonomous mobile robot 140 back to the default mode.

Mode determination module 337 may determine modes in scenarios other than those where another obstacle or robot is approached. For example, mode determination module 337 may use sensors to determine whether any pre-determined entity (e.g., object, human being, obstacle, etc.) is within a large threshold distance. Mode determination module 337 may, responsive to determining that no such entity is within the threshold, determine that an even higher maximum speed may be used by the robot, given that the robot is not in danger of colliding with any prescribed entity. In an embodiment, the mode of the robot may require the robot to illuminate a light that draws a boundary around the robot. The light may represent a minimum separation that the robot must maintain between itself and a human being.

In some embodiments, due to constraints associated with a mode, a robot may pause or stop operation. For example, if a robot cannot clear an obstacle because it is unable to stay at least a required threshold distance away, then the robot may cease operation (e.g., stop moving). Responsive to ceasing operation, the robot may cause an alert to be transmitted (e.g., to one or more of operator device 110 and central communication system 130). The alert may include a reason why the robot is stopped (e.g., cannot clear an obstacle). The alert may also include a next step that the robot will take (e.g., will reverse course and try a different aisle if not given alternate instructions manually within a threshold period of time, such as five minutes). Central communication system 130 may automatically provide instructions to the robot based on information in the map (e.g., abort mission, where another robot can more efficiently take an alternate route; e.g., take an alternate route, etc.). Operator device 110 may similarly issue an instruction to the robot (e.g., through manual interaction with the user interface) to modify its course.

Traversal protocol module 338 determines a traversal protocol to use as a robot progresses across a route. The term traversal protocol, as used herein, may refer to a protocol that dictates how a robot determines the route it should follow. Exemplary traversal protocols may include an autonomous mobile robot (AMR) protocol, an automated guided vehicle (AGV) protocol, and any other protocol. An AMR protocol allows a robot to determine its route from source to destination (or from hop to hop between the source and the destination) autonomously, making dynamic adjustments as conditions are encountered. For example, a robot may take input from a map, as well as sensory input, such as obstacles the robot encounters, when traversing. The robot may alter the route to navigate around obstacles as needed.

An AGV protocol uses markers, where a robot traverses from source to destination along predefined routes selected based on the markers, where each marker, as it is encountered, dictates a next direction for the robot to take. The markers may be any tool that provides sensory input to the robot, such as QR codes, bar codes, RFID sensors, and so on which the robot is equipped to detect using corresponding sensors installed on the robot. The markers need not be physical markers, and instead may be logical markers (e.g., markers indicated in a map, where when a physical point in a facility is reached by the robot, the robot determines that it has reached a next marker). In an embodiment, a user of operator device 110 may define a path for the AGV through a map shown in the user interface. Central communication system 130 may update environment map 240 to indicate the logical markers indicated by the operator, and a next direction for the robot to take (or other activity to perform, such as stop, unload, speed up, etc.) when that logical marker is reached. The logical markers may be communicated to the robot(s), which, when encountering the position of a marker, take the indicated action. In order to localize itself with respect to the map, a robot may use sensors such as LIDAR, cameras, and the like to determine its position.

As a robot traverses along a route (e.g., using an AGV protocol), the robot captures sensory input (e.g., obstacles, markers indicating that a route should be changed, location information indicating that a certain part of the facility has been reached). Traversal protocol module 338 takes in information about the sensory input, and determines whether a condition is met that dictates that the protocol should be changed (e.g., from an AGV protocol to an AMR protocol, or vice versa). An exemplary condition includes detecting, during use of an AGV protocol, a marker indicating that a transition is to be performed to AMR navigation. Another exemplary condition includes detecting, during use of either protocol, that the robot has encountered a location associated with a transition to another protocol (e.g., based on image, input, other sensory input, location input relative to a map, and so on). Responsive to detecting such a condition, traversal protocol module 338 switches routing of the robot from its current protocol in use to another protocol (e.g., from AMR to AGV, or vice versa).

Figure 4:
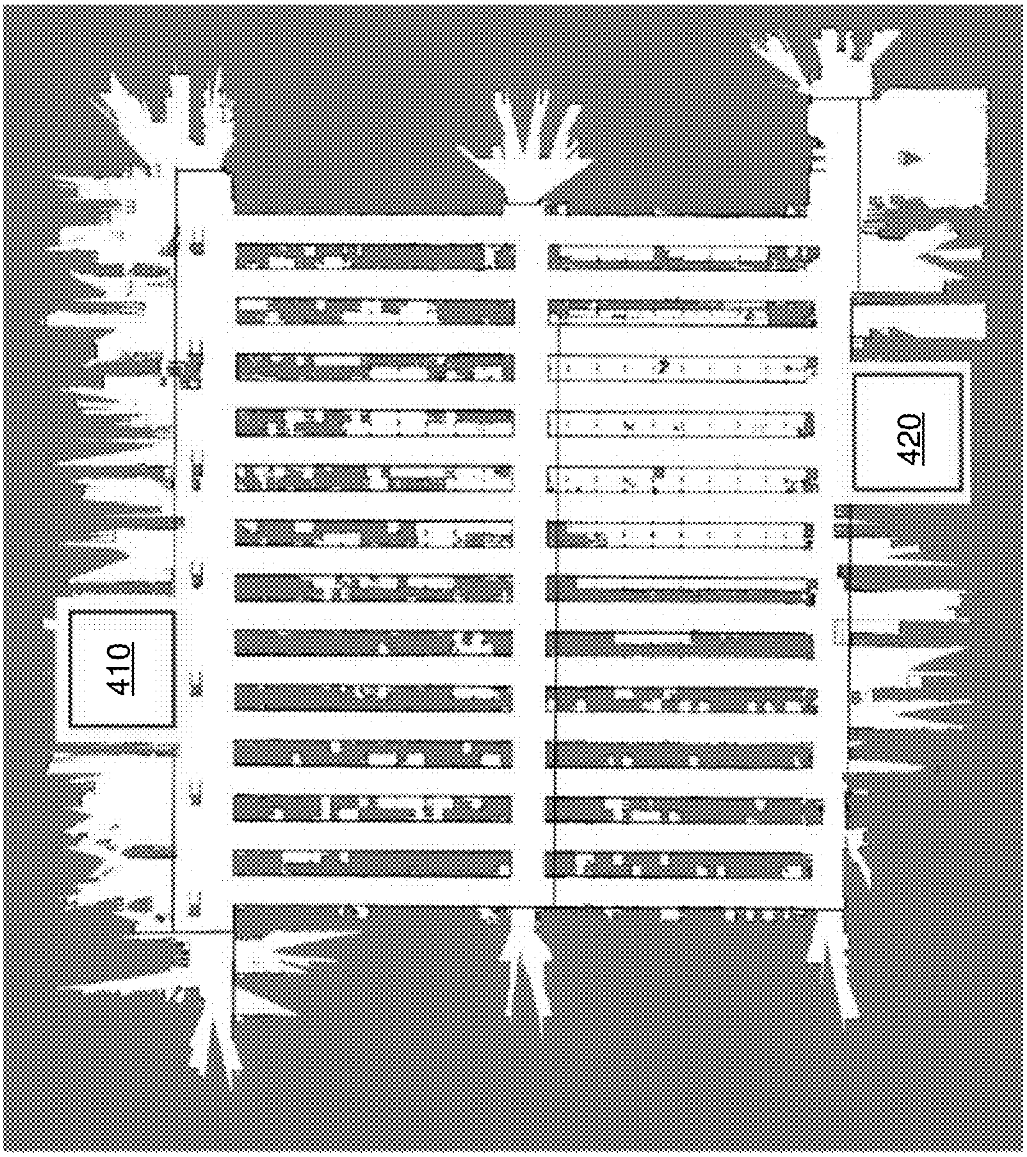
FIG. 4 illustrates an exemplary map of a facility showing areas within the facility, in accordance with one or more embodiments.

FIG. 4 illustrates one embodiment of an exemplary map of a facility showing areas within the facility. As depicted, environment 400 includes source area 410 and destination area 420. The space between source area 410 and destination area 420 includes aisles surrounded of obstacles that cannot be traversed. Autonomous mobile robot 140 may determine which route to traverse (e.g., using navigation module 335) based on information in the map, including information about the location of the obstacles, traffic patterns in each aisle, heat map information corresponding to any form of data, such as human traffic, time of day, robot traffic, and the like. The autonomous mobile robot 140 may determine which route to traverse using additional sensory information, such as camera sensors that depict unexpected obstacles in a given aisle, efficiency information (e.g., a shortest route), and so on.

Exemplary Autonomous Mobile Robot Operation

In an exemplary use case, objects, such as pallets, may arrive at a facility. A source area may be selected in any manner described above (e.g., using source area module 231), the boundaries of which encompass the objects. An operator (e.g., operating operator device 110) may define a mission, where the objects are to be transported from the source area to a destination area. The destination area may be selected in any manner described above (e.g., using destination area module 232. For example, the operator may draw, on a graphical representation of the facility displayed on client device 110, the boundaries of the destination area, or may select a number of pallet stands to which pallets are to be dropped off. In an embodiment, more than one source area and/or more than one destination area may be defined.

After defining the mission, central communication system 130 may select and instruct one or more autonomous mobile robots 140 to execute the mission. To this end, autonomous mobile robot 140 may approach the objects and capture one or more RGB images of the objects. The RGB images may be used to determine poses of the objects, and to determine other attributes of the objects (e.g., a count of the objects, a type of the objects, a volume of the objects, and so on). After evaluating the objects, autonomous mobile robot 140 may determine an order in which to manipulate the objects based on their pose, based on objects that obstruct the robot's ability to approach other objects, and any other factor described herein.

Autonomous mobile robot 140 may then approach and manipulate objects in any manner described herein that enables the objects to be transported to the destination area. Autonomous mobile robot 140 may determine a route from the source area to the destination area in any manner described above (e.g., without input from central communication system 130). Movement speed may be adjusted based on information associated with the object (e.g., weight, fragility, etc.). Autonomous mobile robot 140, when approaching the destination area, may determine how to unload the object based on mission information, such as ensuring that objects are unloaded in a manner that allows the destination area to accommodate all remaining objects. For example, the autonomous mobile robot 140 may fill a destination area from back-to-front. Autonomous mobile robot 140 may input mission information and destination area information into a machine learning model, and receive as output a plan for unloading objects in the destination area. Autonomous mobile robot 140 may use a default plan for unloading objects in the destination area. In an embodiment, autonomous mobile robot 140 may determine that the destination area is not suitable to accommodate the mission, and may alter the destination area (e.g., by causing obstacles to be moved), add space to the defined destination area, or alert the operator to do the same.

Autonomous mobile robot 140 may cause the mission parameters to be updated as the mission continues. For example, the autonomous mobile robot 140 may have initially miscounted an amount of objects to be transported as part of the mission due to some objects occluding other objects, where the occluded objects are revealed as non-occluded objects are manipulated. This example would cause autonomous mobile robot 140 to adjust the count of objects, which may, in turn, cause other mission parameters to be adjusted (e.g., destination area size, order of transporting objects, etc.).

Example Environment for Operating an Autonomous Mobile Robot

Figure 5:
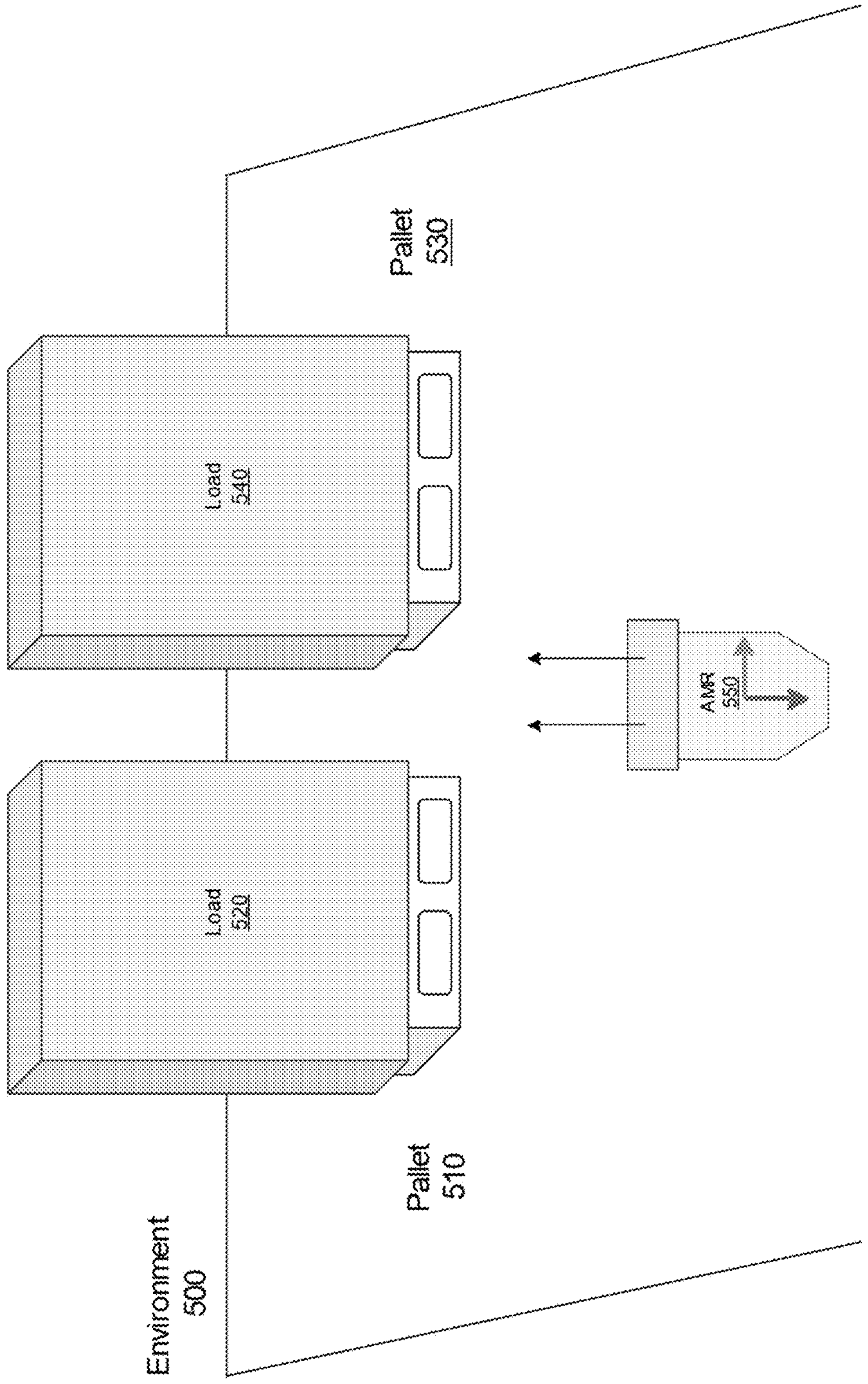
FIG. 5 illustrates an example environment for operating an autonomous mobile robot for the purpose of handling palletized loads, in accordance with one or more embodiments.

FIG. 5 illustrates an example environment for operating an autonomous mobile robot 550 for the purpose of handling palletized loads, in accordance with one or more embodiments. While this environment 500 is primarily described as a warehouse setting (including trailers or staging areas), it is adaptable to various settings such as retail stores or sports stadiums. This environment encompasses multiple pallets 510, 530 with loads 520, 540 stacked upon them. The autonomous mobile robot 550 is specially configured to transport these palletized loads within the environment. Typically, the robot's operations involve loading and unloading trailers. In some embodiments, during these operations, robot 550 faces the pallets directly, rendering only the front faces of the pallets and loads visible to its sensors, which may include cameras, 3D light detection and ranging sensors (LiDAR), time-of-flight cameras, or other depth sensors.

Figure 6:
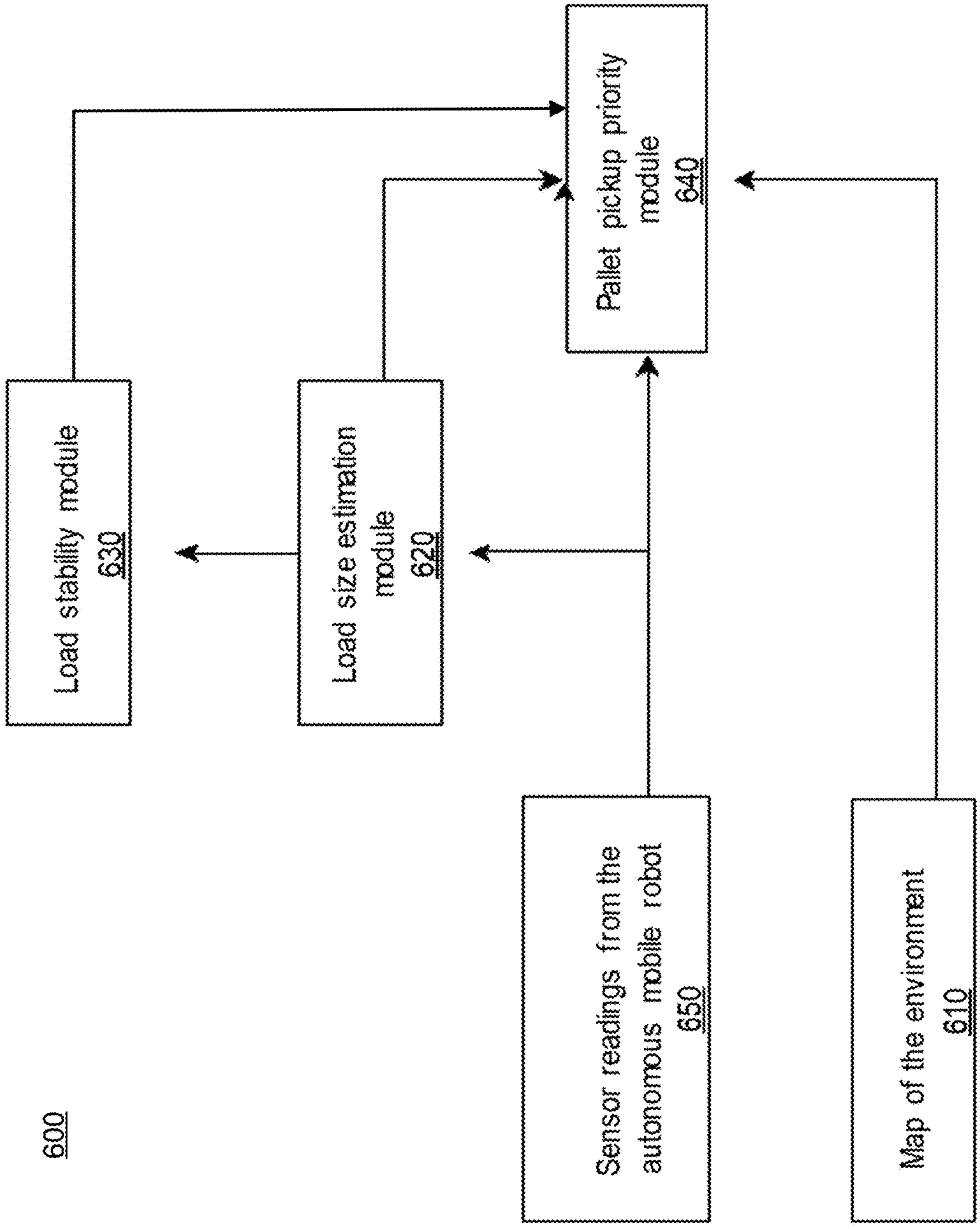
FIG. 6 illustrates one example architecture of the load stability determination system, in accordance with one or more embodiments.

FIG. 6 illustrates one example architecture of the load stability determination system 600, in accordance with one or more embodiments. In some embodiments, the load stability determination system 600 may be a computing system (such as the operator device 110, or central communication system 130) configured to communicate with the autonomous mobile robot 140 via network 120. Alternatively, the load stability determination system 600 may be a component of the autonomous mobile robot 140. The load stability determination system 600 includes one or more sensors 650, a map module 610, a load size estimation module 620, a pallet pick up priority module 640, and a load stability module 630. Map module 610 obtains or has access to a map of an environment, such as environment 500. One or more sensors 650 may be coupled to the autonomous mobile robot 550, and they can be cameras, 3D LiDARs or any kind of depth sensors). The sensors 650 are configured to provide the sensing data to the load size estimation module 620. The load size estimation module 620 is configured to determine or estimate a load size based on the received sensing data. The load stability module 630 is configured to determine the load stability and safety for transfer based on the estimated load size. If the load stability module 630 determines that it is safe to transfer the load, the pallet pickup priority module 640 receives the information about the load, and prioritizes the load among other loads that can be safely transferred. In some embodiments, the pallet pickup priority module 640 is configured to determine the priority based further on the estimated load size. For example, a larger load is assigned a higher priority, and a smaller load is assigned a lower priority, or vice versa. In some embodiments, the pallet pickup priority module 640 is configured to determine the priority based further on the map of the environment and the location of the load.

Figure 7:
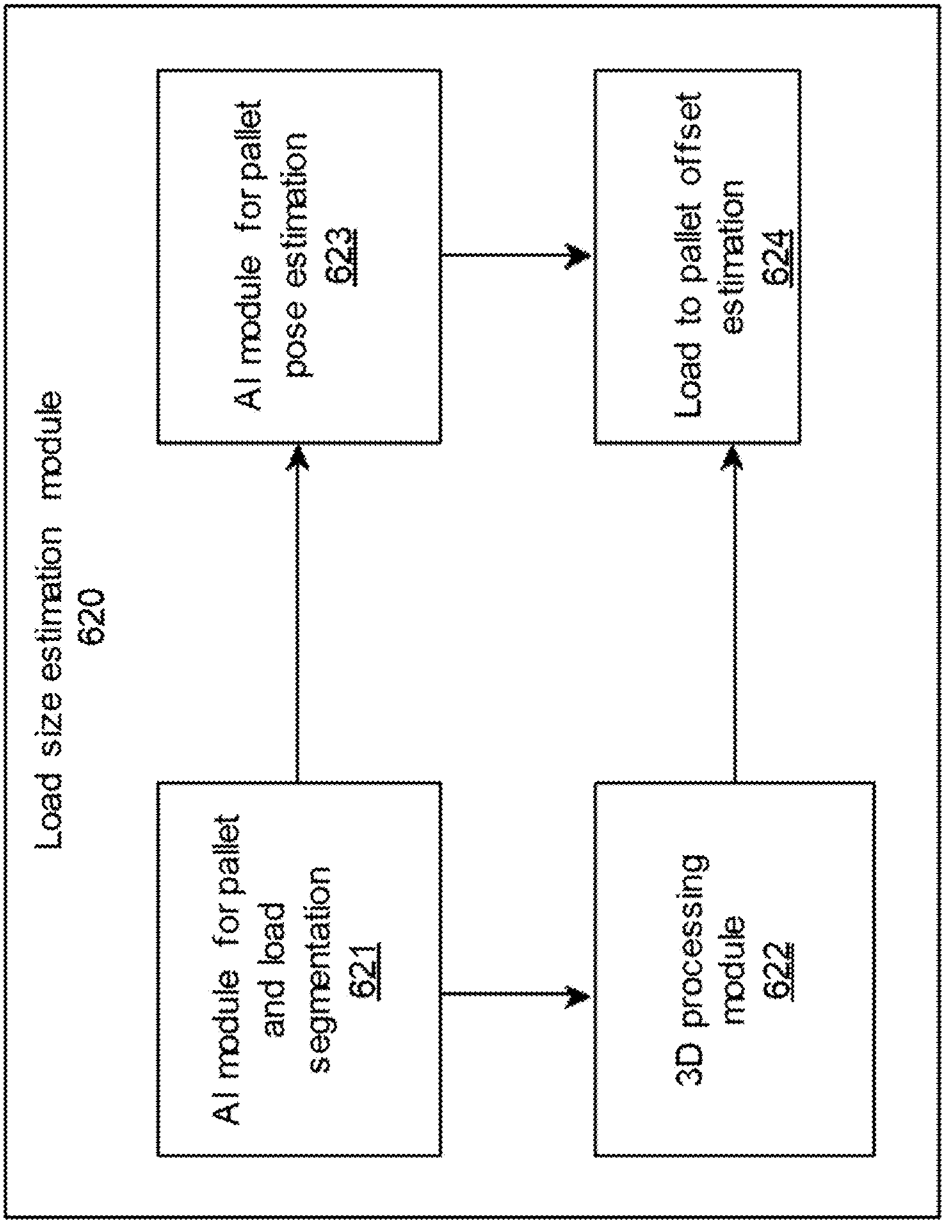
FIG. 7 illustrates an example architecture of the load size estimation module in accordance with one or more embodiments.

FIG. 7 illustrates an example architecture of the load size estimation module 620 in accordance with one or more embodiments. The load size estimation module 620 includes a first AI module 621 for pallet and load segmentation, a second AI module 623 for pallet pose estimation, a 3D processing module 622, and a load to pallet offset estimation module 624. The load size estimation module 620 takes the images and/or depth measurements of the visible parts of palletized goods. The first AI module 621 is configured to isolate the visible part of the load (such as the front face) and determine the type of the underlying pallet. The first AI module 621 may be a deep learning model trained to perform instance segmentation, which can be used to obtain masks of the pallet and the front faces of loads. Different kinds of techniques may be used to achieve this goal.

Once the visible part of the load has been isolated in images, the 3D processing module 622 determines 3D positions of the load with respect to the robots. The 3D processing module 622 uses the masks and depth to determine the point cloud of the load front faces. In some embodiments, the robot may further assume front faces are a plane in 3D space. This embodiment may be quite advantageous in cases with unreliable depth on some parts of the load.

The masks of the pallets and the pallet type information from module 121 are used as the input to the pallet pose estimation module 623, which estimates the pallet orientation, dimensions and translation with respect to the robot. Different kinds of pose estimation models could be used here. These pose estimations, along with the point clouds obtained from the 3D processing module 622, are used as inputs to the load to pallet offset estimation module 624. The load to pallet offset estimation module 624 may use an AI/deep learning model to estimate the size and position of the load relative to the pallet. As indicated before, module 624 may use the pallet orientation, dimension, or translation with respect to the robot to estimate the size and position of the load relative to the pallet. The module 624 also may use images captured by the robot to make these estimates. Module 624 thereby determines if the load on a pallet is overhanging or underhanging the pallet and by how much. This information is used to determine the distance to the neighboring loads and stability of the load for transfer.

Figure 8:
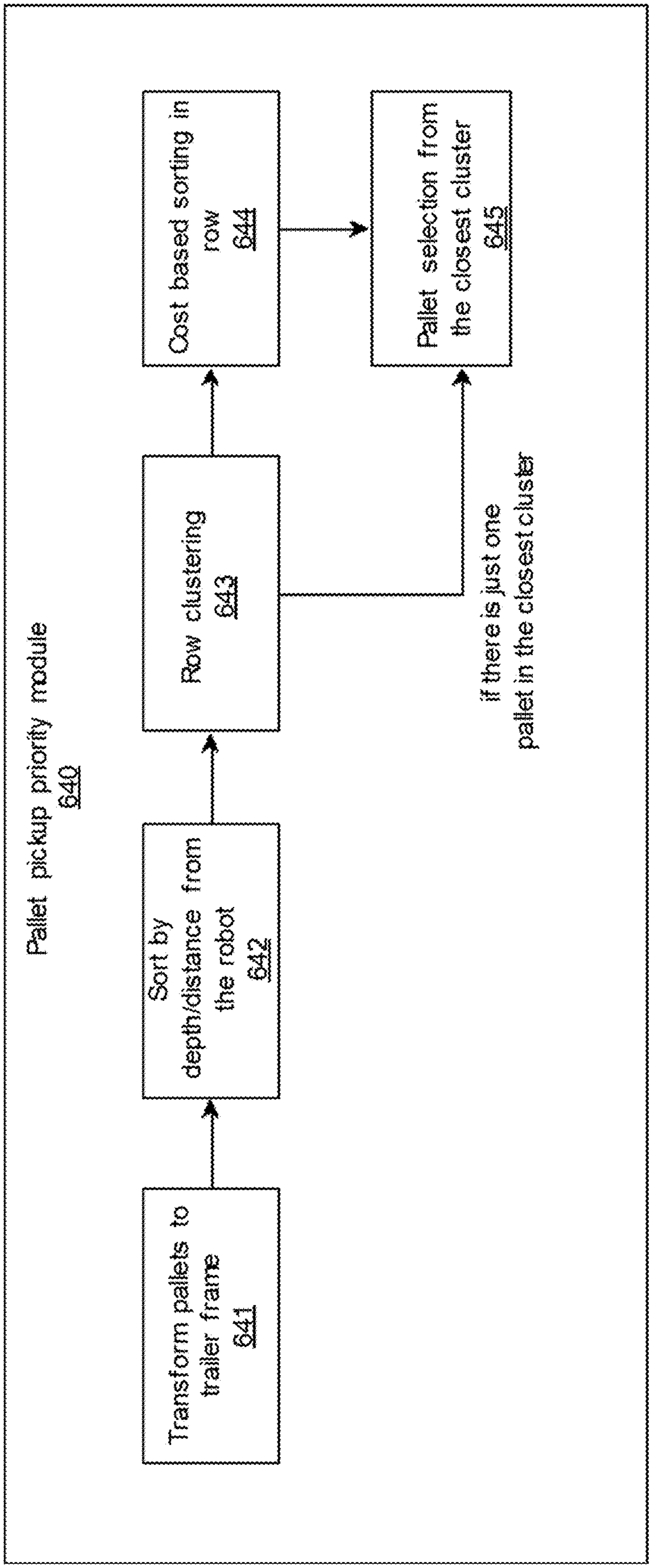
FIG. 8 illustrates an example architecture of the pallet pickup priority module, in accordance with one or more embodiments.

FIG. 8 illustrates an example architecture of the pallet pickup priority module 640, in accordance with one or more embodiments. The pallet pickup priority module 640 includes a transformer module 641, a sorting module 642, a row clustering module 643, a cost-based sorting module 644, and a pallet selection module 645.

In some embodiments, the pallet pickup priority module 640 takes the following inputs: (1) the pallet poses in terms of rotation and translation with respect to the robot, 2) load size estimates represented as 3D bounding boxes (polygons); and/or (3) the map of the environment (which can be obtained as a result of the simultaneous localization and mapping algorithm or from a CAD model). Since the pallet poses are computed with respect to the robot's coordinate system, the transformer module 641 is configured to transform them into the coordinate system of the map, e.g. trailer map (accessible from the map module 641). The sorting module 642 then sorts the pallets according to the distance to the robot in ascending (or descending) order, where the closest pallets come first. After that, the row clustering module 643 clusters the pallets into rows. The cost-based sorting module 644 may further sort pallets in each row based on their costs in ascending or descending order. The pallet selection module 645 is configured to select based on the closest cluster, highest/lowest cost cluster, and/or highest/lowest cost pallet.

Figure 9:
FIG. 9 illustrates an example process performed by the row clustering module, in accordance with one or more embodiments.

FIG. 9 illustrates an example process performed by the row clustering module 643, in accordance with one or more embodiments. As illustrated in FIG. 9, there are multiple pallet polygons in an environment, and the pallet polygons are grouped into the same row by taking into account the spatial and geometric constraints of the pallet, the load, the robot, and the trailer. If two nearby pallet polygons do not overlap when translated left/right by some margin (which may be set manually or determined automatically by row clustering module 643), they are grouped into the same row. After grouping into rows, the optimal pallet for pickup is selected from the closest row according to one or more criteria. Such criteria may include: if the closest row includes a single pallet polygon, then this is the pallet to be picked-up. Otherwise, the cost-based sorting algorithm within the row is used to order the pallets within a closest row, which may be determined by pallet selection module 645.

Figure 10:
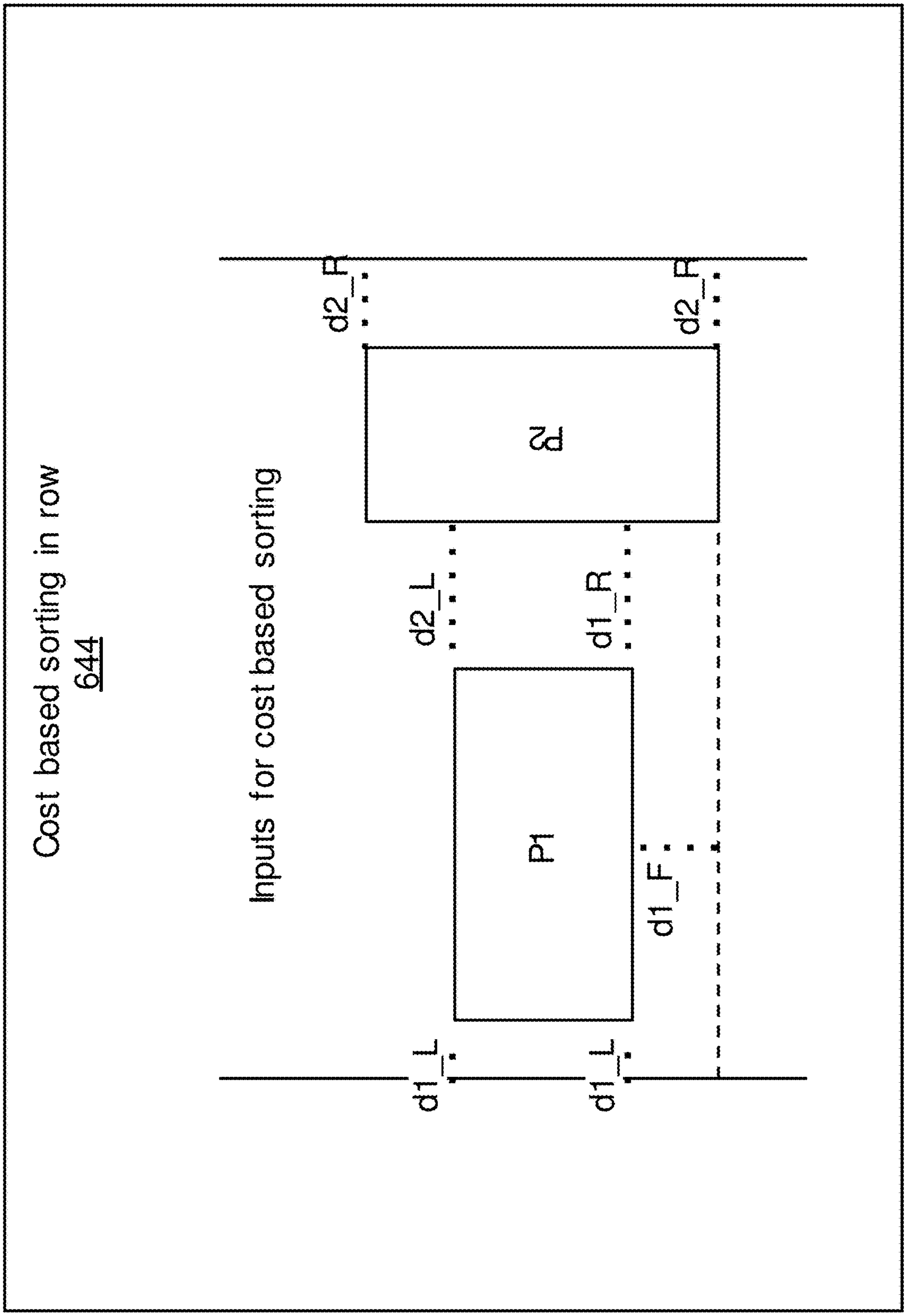
FIG. 10 illustrates an example process performed by the cost-based sorting module, in accordance with one or more embodiments.

FIG. 10 illustrates an example process performed by the cost-based sorting module 644, in accordance with one or more embodiments. The cost-based sorting module 644 takes into account the distance between the neighboring pallets (d1_R, d2_L) in the row as well as the spatial constraints of the environment (e.g., distances to the trailer walls d1_L, d2_R). The cost is then defined as a combination of distances from the neighboring pallets and distances from other pallets in the row. The problem of sorting the pallet polygons and computing their respective distances is again defined geometrically by computing the distance between the two polygons or a polygon and a straight line representing the boundary of the environment, e.g., the trailer wall. The next pallet is then selected as the one with the largest distance towards the neighboring pallet and the environment boundary.

Figure 11:
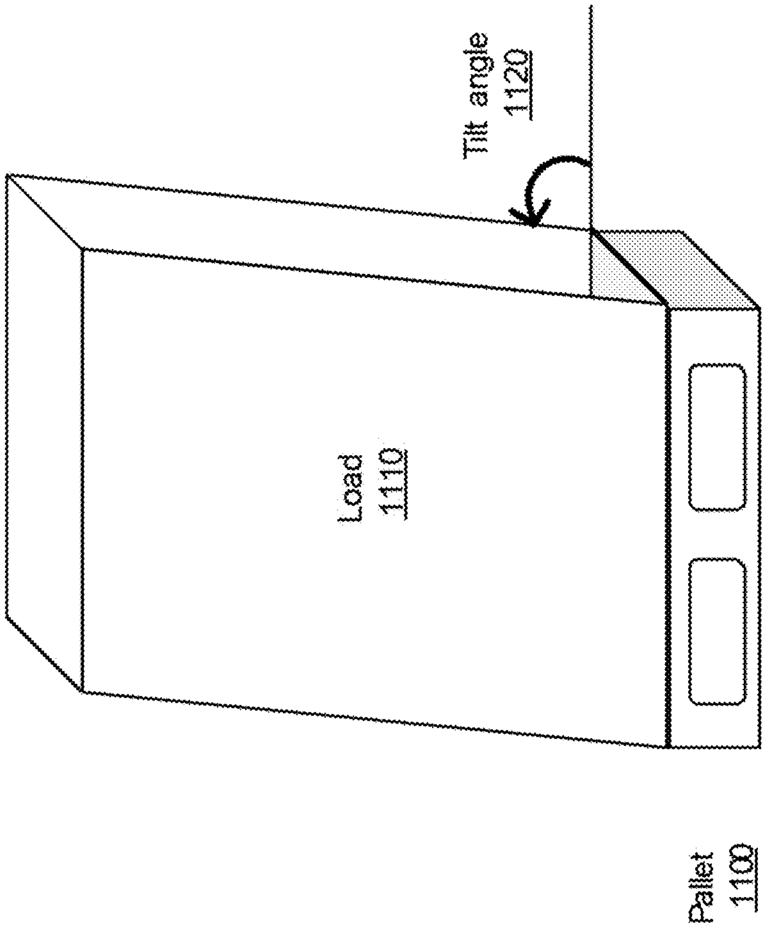
FIG. 11 illustrates an example tilted load on a pallet.
Figure 12:
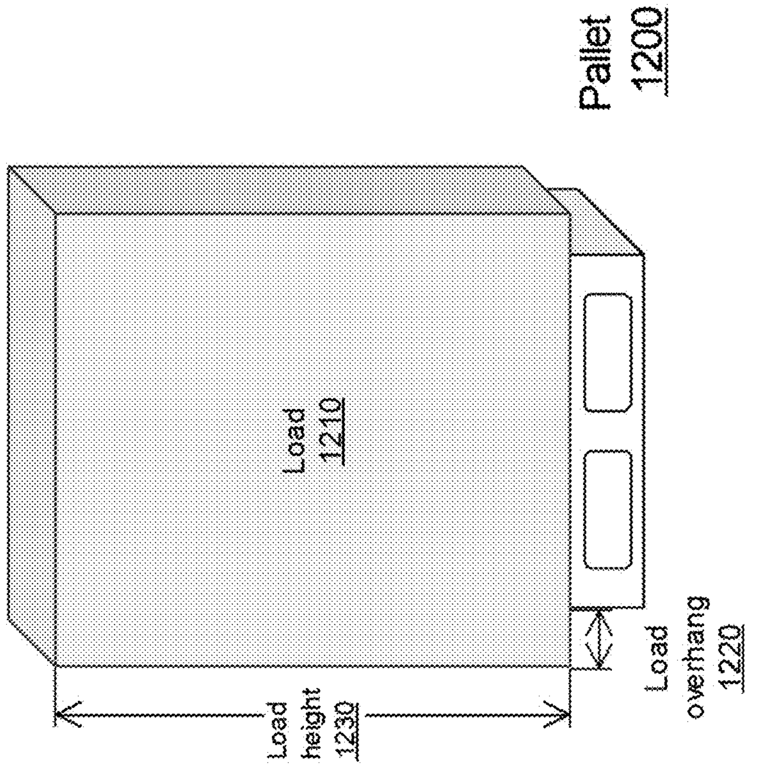
FIG. 12 illustrates an example overhanging load on a pallet.

FIG. 11 illustrates an example of tilted load 1110 on pallet 1100, while FIG. 12 illustrates an example of an overhanging load 1210 on pallet 1200. As illustrated in FIG. 11, in some embodiments, the system described herein is able to extract information about a tilt angle 1120 of a load. As illustrated in FIG. 12, in some embodiments, the system described herein is able to extract information about overhang 1220, load height 1230, and tilt angle 1120 can be extracted by the load to pallet offset estimation module 624 in FIG. 6.

Figure 13:
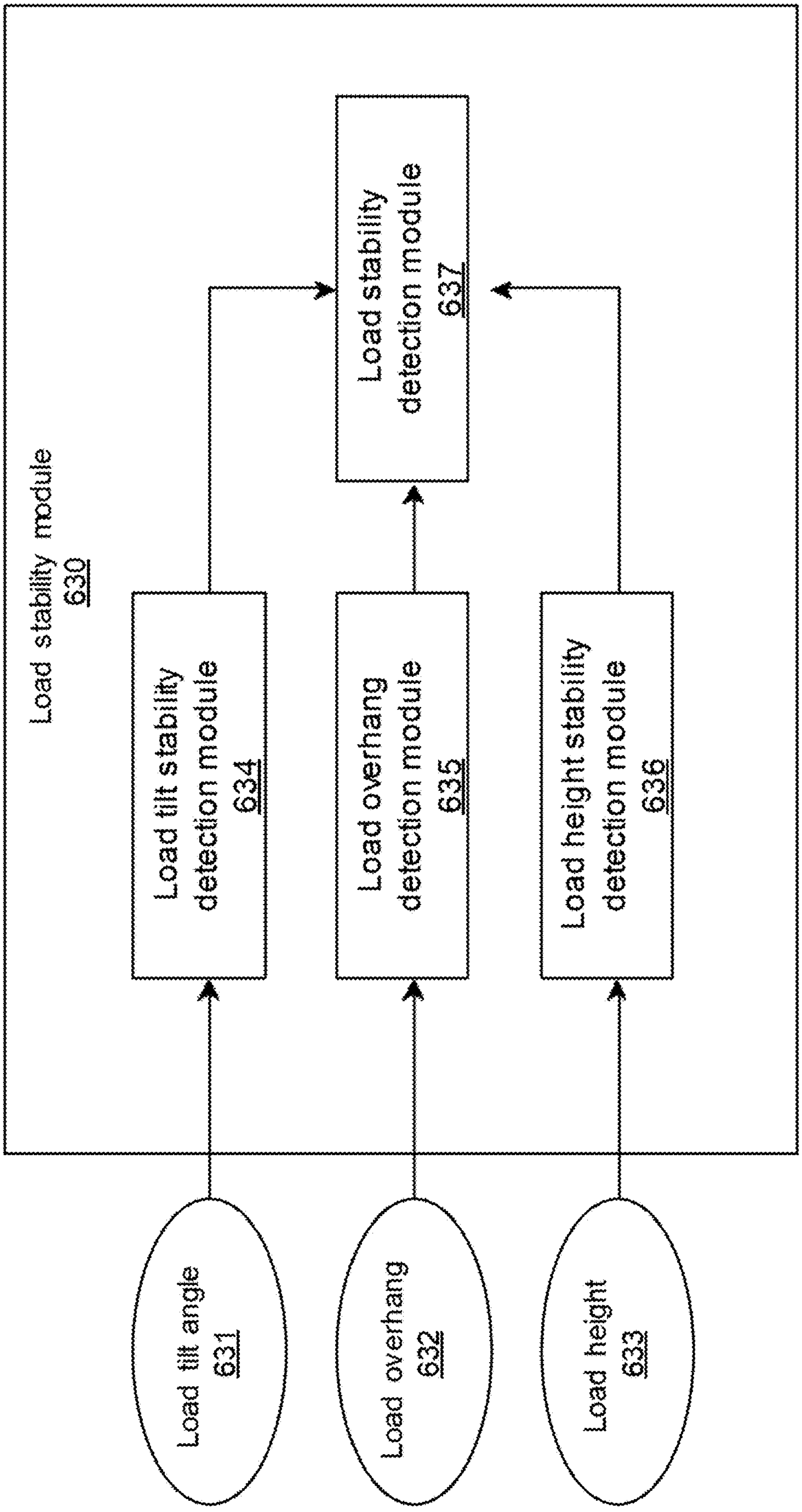
FIG. 13 illustrates an example architecture of the load stability estimation module, in accordance with one or more embodiments.

FIG. 13 illustrates an example architecture of the load stability estimation module 630, in accordance with one or more embodiments. The load stability estimation module 630 comprises four sub-modules: the load tilt stability detection module 634, the load overhang detection module 635, the load height stability detection module 636, and the load stability detection module 637. This module 630 processes outputs from the load-to-pallet offset estimation (possibly estimated by module 624 in FIG. 7), along with load tilt angle information 631, load overhang information 632, and load height information 633.

The load tilt stability detection module 634 utilizes load tilt angle information 631 to determine the load's tilt stability or to assign a load tilt stability score indicating the level of load tilt stability. The load overhang detection module 635 uses load overhang information 632 to assess the stability of the load overhang, or to generate a load overhang score reflecting the level of overhang. The load height stability detection module 636 employs load height information 633 to ascertain if the load height is stable, or to provide a load height score that signifies the load's height stability. These assessments from the load tilt stability detection module 634, load overhang detection module 635, and load height stability detection module 636 are then fed into the load stability detection module 637. This module 637 synthesizes all individual determinations to make an overall assessment of the load's stability, which is crucial for determining its suitability for movement.

In some embodiments, the load tilt angle information 631 is used as an input to the load tilt stability detection module 634. Module 634 detects if the tilt angle crosses a certain stability threshold. In a similar manner, load overhang information 632 is used as an input to the load overhang detection module 635, and load height information 633 is used as an input to the load height stability detection module 636. Modules 635 and 636 detect if the input values cross the appropriate stability values for the overhang offset and load height. The appropriate stability thresholds could be determined based on a number of variables, such as (but not limited to) load dimensions, load weight, load type (e.g., less expensive paper towels vs boxes with expensive computer chips), trailer height, etc.

Example Method for Determining Stability of Pallet Loads

Figure 14:
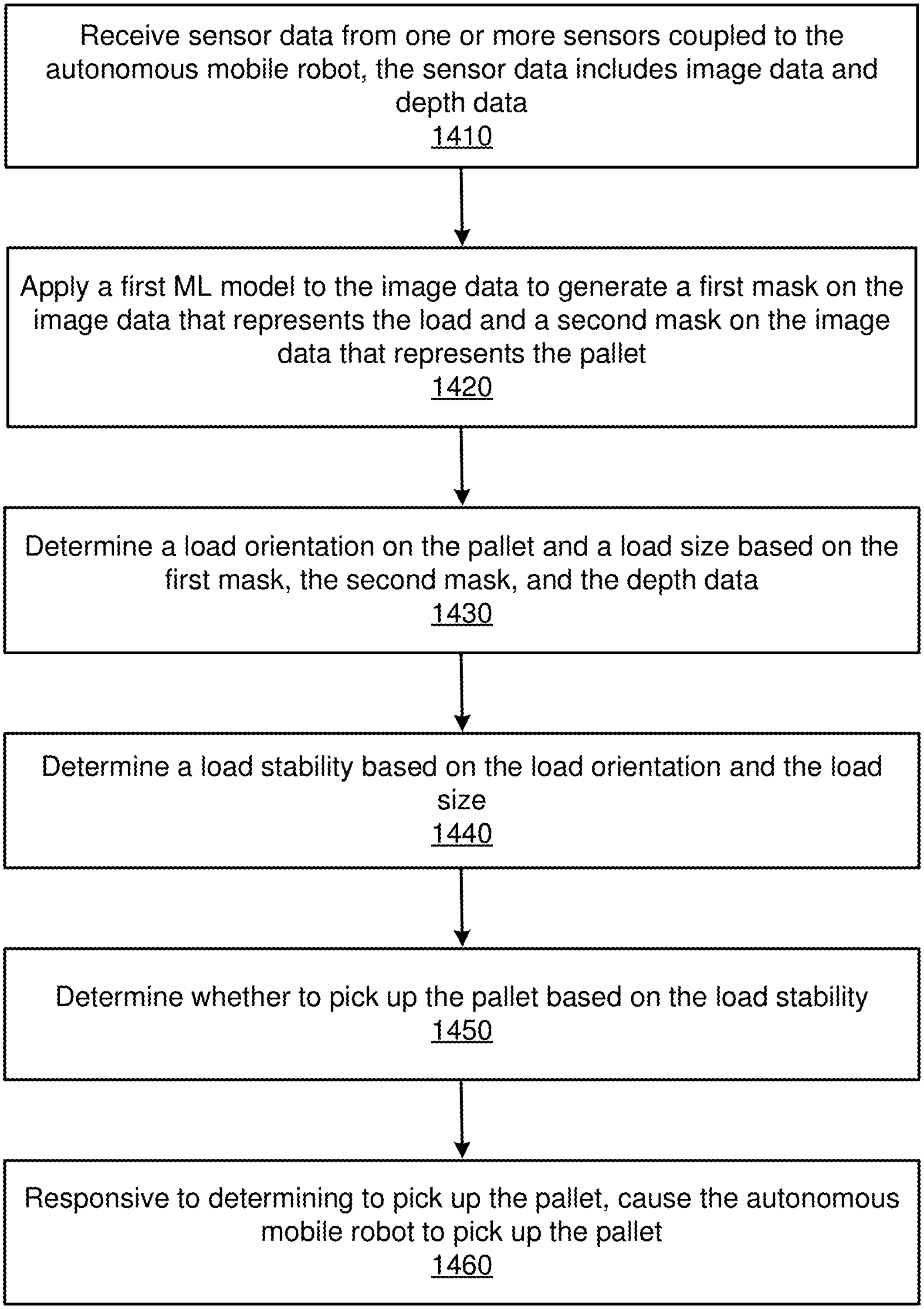
FIG. 14 is a flowchart illustrating an example method of determining stability of pallet loads, in accordance with one or more embodiments.

FIG. 14 is a flowchart illustrating an example method 1400 of determining stability of pallet loads, in accordance with one or more embodiments. In various embodiments, method 1400 includes different or additional steps than those described in conjunction with FIG. 14. Further, in some embodiments, the steps of the method may be performed in different orders than the order described in conjunction with FIG. 14. The method described in conjunction with FIG. 14 may be carried out by the load stability determination system 600 in various embodiments, while in other embodiments, the steps of the method are performed by any online system capable of receiving sensor data from the autonomous mobile robot.

The load stability determination system 600 receives 1410 sensor data from one or more sensors coupled to the autonomous mobile robot, e.g., robot 550. The sensor data includes image data depicting the load coupled to the pallet. The sensor data also includes depth data indicating distance of surfaces of the load or the pallet from the one or more sensors. The one or more sensors may include (but are not limited to) cameras and/or LIDAR systems.

The load stability determination system 600 applies 1420 a first machine learning model to the image data to generate a first mask on the image data that represents the load and a second mask on the image data that represents the pallet. The load stability determination system 600 determines 1430 a load orientation on the pallet and a load size based on the first mask, the second mask, and/or the depth data. The load stability determination system 600 determines 1440 a load stability based on the load orientation and the load size.

In some embodiments, the determination 1440 of the load stability further includes determining a load tilt angle, and the load stability is determined further based on the load tilt angle. For example, in some embodiments, when the load tilt angle is greater than a threshold, it is determined that the load is unstable. In some embodiments, the determination 1440 of the load stability further includes determining a load overhang, and the load stability is determined further based on the load overhang. For example, in some embodiments, when the load overhang is greater than a threshold, it is determined that the load is unstable. In some embodiments, the determination 1440 of the load stability further includes determining a load height, and the load stability is determined further based on the load height. For example, in some embodiments, when the load height is greater than a threshold, it is determined that the load is unstable. In some embodiments, a score is computed for the load tilt angle, a load overhang, and/or a load height, and a weighted average is determined as an overall score, which is then used to determine the load stability. For example, in some embodiments, when the overall score is greater than a threshold, it is determined that the load is unstable.

The load stability determination system 600 determines 1450 whether to pick up the pallet based on the load stability. Responsive to determining to pick up the pallet, the load stability determination system 600 causes 1460 the autonomous mobile robot to pick up the pallet.

In some embodiments, a second machine learning model is applied to the received sensor data to determine a pose of the pallet relative to the one or more sensors. The pose of the pallet is a position and orientation of the pallet relative to the one or more sensors. In some embodiments, a transformation is performed over the relative pose of the pallet to determine a pose of the pallet in the environment based on the determined relative pose and a map of the environment.

In some embodiments, the load stability determination system 600 further determines a priority of the load. For example, there may be multiple pallet loads in the environment. The load stability determination system 600 is able to determine a priority for each pallet load, and cause the autonomous mobile robot to pick up the load based on the determined priority. In some embodiments, the priority is determined based in part on the pose of the pallet in the environment. In some embodiments, the load stability determination system 600 further determines a cost of each load, and the priority is determined based in part on the costs of the loads.

Computing Machine Architecture

Figure 15:
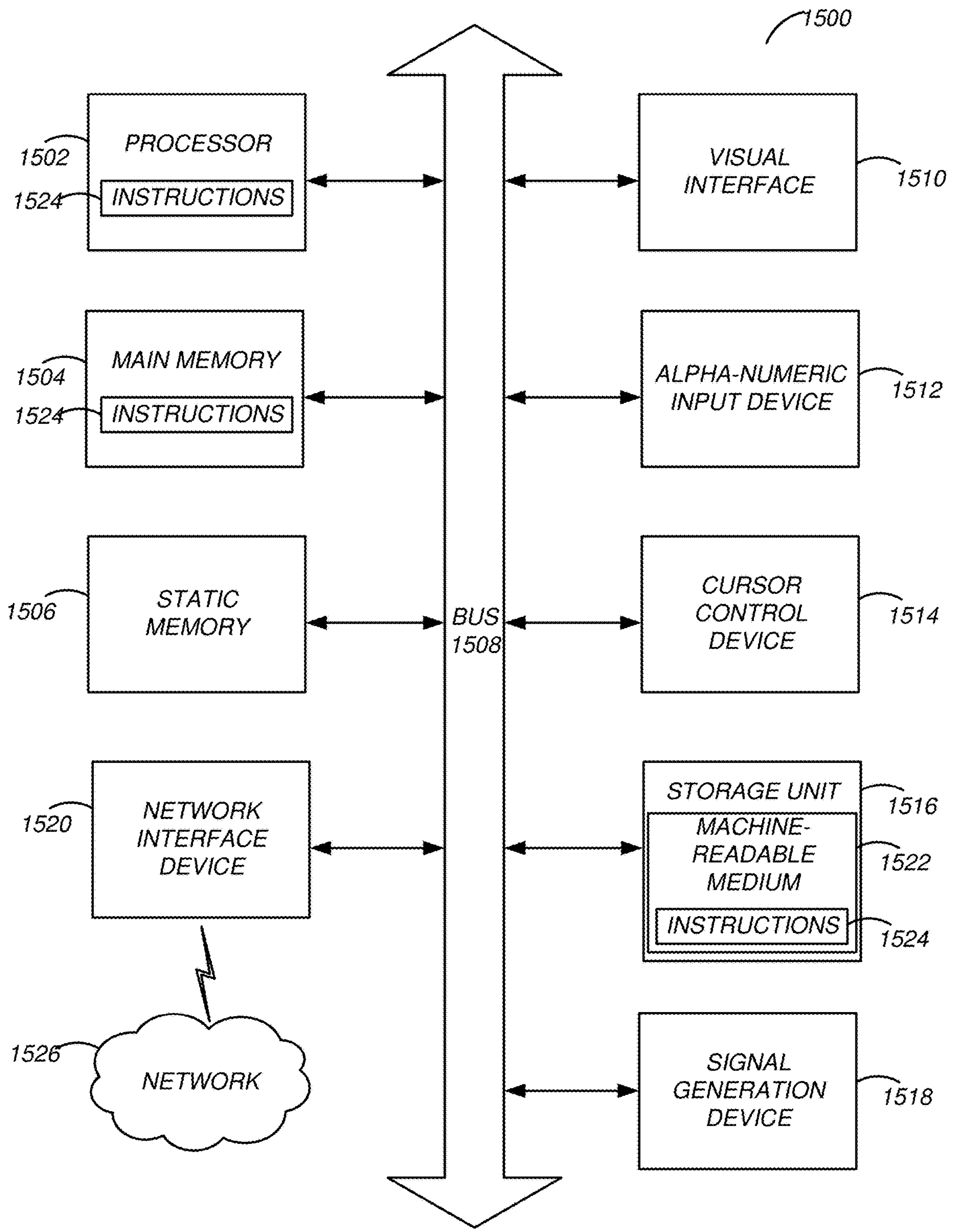
FIG. 15 is a block diagram illustrating components of an example machine able to read instructions from a machine-readable medium and execute them in a processor (or controller), in accordance with one or more embodiments.

FIG. 15 is a block diagram illustrating components of an example machine able to read instructions from a machine-readable medium and execute them in a processor (or controller). Specifically, FIG. 15 shows a diagrammatic representation of a machine in the example form of a computer system 1500 within which program code (e.g., software) for causing the machine to perform any one or more of the methodologies discussed herein may be executed. The program code may be comprised of instructions 1524 executable by one or more processors 1502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1524 (sequential or otherwise) that specify actions to be taken by that machine. Further, while only a single machine is illustrated, the term "machine" shall also be taken to include any collection of machines that individually or jointly execute instructions 1524 to perform any one or more of the methodologies discussed herein.

The example computer system 1500 includes a processor 1502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1504, and a static memory 1506, which are configured to communicate with each other via a bus 1508. The computer system 1500 may further include visual display interface 1510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1510 may include or may interface with a touch enabled screen. The computer system 1500 may also include alphanumeric input device 1512 (e.g., a keyboard or touch screen keyboard), a cursor control device 1514 (e.g., a mouse, a trackball, a joystick, a motion sensor, or other pointing instrument), a storage unit 1516, a signal generation device 1518 (e.g., a speaker), and a network interface device 1520, which also are configured to communicate via the bus 1508.

The storage unit 1516 includes a machine-readable medium 1522 on which is stored instructions 1524 (e.g., software) embodying any one or more of the methodologies or functions described herein. The instructions 1524 (e.g., software) may also reside, completely or at least partially, within the main memory 1504 or within the processor 1502 (e.g., within a processor's cache memory) during execution thereof by the computer system 1500, the main memory 1504 and the processor 1502 also constituting machine-readable media. The instructions 1524 (e.g., software) may be transmitted or received over a network 1526 via the network interface device 1520.

While machine-readable medium 1522 is shown in an example embodiment to be a single medium, the term "machine-readable medium" should be taken to include a single medium or multiple media (e.g., a centralized or distributed database, or associated caches and servers) able to store instructions (e.g., instructions 1524). The term "machine-readable medium" shall also be taken to include any medium that is capable of storing instructions (e.g., instructions 1524) for execution by the machine and that cause the machine to perform any one or more of the methodologies disclosed herein. The term "machine-readable medium" includes, but not be limited to, data repositories in the form of solid-state memories, optical media, and magnetic media.

What is claimed is:

1. A method comprising:

receiving sensor data from one or more sensors coupled to an autonomous mobile robot, wherein the sensor data comprises image data depicting a load coupled to a pallet in an environment, and depth data indicating distance of surfaces of the load or the pallet from the one or more sensors;

applying a first machine-learning model to the image data to generate a first mask on the image data that represents the load and a second mask on the image data that represents the pallet;

determining a load orientation and load size based on the first mask, the second mask, and the depth data;

determining a load stability based on the load orientation and the load size;

determining whether to pick up the pallet based on the load stability; and responsive to determining to pick up the pallet, causing the autonomous mobile robot to pick up the pallet.

2. The method of claim 1, wherein determining the load stability further comprising:

determining a load tilt angle; and determining the load stability based on the determined load tilt angle.

3. The method of claim 1, wherein determining the load stability further comprising:

determining a load overhang; and determining the load stability based on the determined load overhang.

4. The method of claim 1, wherein determining the load stability further comprising:

determining a load height; and determining the load stability based on the determined load height.

5. The method of claim 1, further comprising:

determining a priority of the load; and causing the autonomous mobile robot to pick up the load based on the determined priority.

6. The method of claim 5, wherein determining the priority further comprising:

determining a relative pose of the pallet relative to the one or more sensors to the pallet;

determining a pose of the pallet in the environment based on the determined relative pose and a map of the environment; and determining the priority based on the pose of the pallet in the environment.

7. The method of claim 6, determining the relative pose of the pallet relative to the one or more sensors comprising:

applying a second machine-learning model to the received sensor data to determine the relative pose of the pallet relative to the one or more sensors.

8. The method of claim 5, determining the priority further comprising:

determining a cost of the load; and determining the priority based in part on the cost of the load.

9. A non-transitory computer-readable medium storing instructions that, when executed by a processor, cause the processor to:

receiving sensor data from one or more sensors coupled to an autonomous mobile robot, wherein the sensor data comprises image data depicting a load coupled to a pallet in an environment, and depth data indicating distance of surfaces of the load or the pallet from the one or more sensors;

apply a first machine-learning model to the image data to generate a first mask on the image data that represents the load and a second mask on the image data that represents the pallet;

determine a load orientation and load size based on the first mask, the second mask, and the depth data;

determine a load stability based on the load orientation and the load size;

determine whether to pick up the pallet based on the load stability; and responsive to determining to pick up the pallet, cause the autonomous mobile robot to pick up the pallet.

10. The non-transitory computer-readable medium of claim 9, wherein determining the load stability further comprising:

determining a load tilt angle; and determining the load stability based on the determined load tilt angle.

11. The non-transitory computer-readable medium of claim 9, wherein determining the load stability further comprising:

determining a load overhang; and determining the load stability based on the determined load overhang.

12. The non-transitory computer-readable medium of claim 9, wherein determining the load stability further comprising:

determining a load height; and determining the load stability based on the determined load height.

13. The non-transitory computer-readable medium of claim 9, further comprising:

determining a priority of the load; and causing the autonomous mobile robot to pick up the load based on the determined priority.

14. The non-transitory computer-readable medium of claim 13, wherein the processor is further caused to:

receiving sensor data from one or more sensors coupled to an autonomous mobile robot, wherein the sensor data describes a load coupled to a pallet, wherein determining the priority further comprising:

determining a relative pose of the pallet relative to the one or more sensors to the pallet;

determining a pose of the pallet in the environment based on the determined relative pose and a map of the environment; and determining the priority based on the pose of the pallet in the environment.

15. The non-transitory computer-readable medium of claim 14, determining the relative pose of the pallet relative to the one or more sensors comprising:

applying a second machine-learning model to the received sensor data to determine the relative pose of the pallet relative to the one or more sensors.

16. The non-transitory computer-readable medium of claim 14, determining the priority further comprising:

determining a cost of the load; and determining the priority based in part on the cost of the load.

17. A system comprising a processor and a non-transitory computer-readable medium storing instructions that, when executed by the processor, cause the processor to:

receiving sensor data from one or more sensors coupled to an autonomous mobile robot, wherein the sensor data comprises image data depicting a load coupled to a pallet in an environment, and depth data indicating distance of surfaces of the load or the pallet from the one or more sensors;

apply a first machine-learning model to the image data to generate a first mask on the image data that represents the load and a second mask on the image data that represents the pallet;

determine a load orientation and load size based on the first mask, the second mask, and the depth data;

determine a load stability based on the load orientation and the load size;

determine whether to pick up the pallet based on the load stability; and responsive to determining to pick up the pallet, cause the autonomous mobile robot to pick up the pallet.

18. The system of claim 17, wherein determining the load stability further comprising:

determining a load tilt angle; and determining the load stability based on the determined load tilt angle.

19. The system of claim 17, wherein determining the load stability further comprising:

determining a load overhang; and determining the load stability based on the determined load overhang.

20. An autonomous mobile robot comprising:

a camera;

a processor;

a non-transitory computer-readable medium storing instructions that, when executed by the processor, cause the processor to:

receive image data and depth data from one or more sensors coupled to an autonomous mobile robot, wherein the image data comprises an image depicting a load coupled to a pallet in an environment, and depth data comprises information indicating distance of surfaces of the load or the pallet from the one or more sensors;

apply a first machine-learning model to the image data to generate a first mask on the image data that represents the load and a second mask on the image data that represents the pallet;

determine a load orientation and load size based on the first mask, the second mask, and the depth data;

determine a load stability based on the load orientation and the load size;

determine whether to pick up the pallet based on the load stability; and responsive to determining to pick up the pallet, cause the autonomous mobile robot to pick up the pallet.

* * * * *